United States Patent
Dotan-Cohen et al.

(10) Patent No.: US 12,477,081 B2
(45) Date of Patent: Nov. 18, 2025

(54) MEETING INFORMATION SHARING PRIVACY TOOL

(71) Applicant: MICROSOFT TECHNOLOGY LICENSING, LLC, Redmond, WA (US)

(72) Inventors: Dikla Dotan-Cohen, Netanya (IL); Ido Mordechai Priness, Kiryat Ono (IL); Tomer Hermelin, Ramat Hasharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 378 days.

(21) Appl. No.: 18/148,692

(22) Filed: Dec. 30, 2022

(65) Prior Publication Data
US 2024/0223726 A1 Jul. 4, 2024

(51) Int. Cl.
| | | |
|---|---|---|
| H04N 7/15 | (2006.01) | |
| G06F 3/0482 | (2013.01) | |
| G06F 18/22 | (2023.01) | |
| G06T 5/70 | (2024.01) | |
| G06V 30/19 | (2022.01) | |
| H04N 7/14 | (2006.01) | |

(52) U.S. Cl.
CPC ......... *H04N 7/152* (2013.01); *G06F 3/0482* (2013.01); *G06F 18/22* (2023.01); *G06T 5/70* (2024.01); *G06V 30/19093* (2022.01); *H04N 7/147* (2013.01)

(58) Field of Classification Search
CPC .............................. H04N 7/152; H04N 7/147
See application file for complete search history.

(56) References Cited

U.S. PATENT DOCUMENTS

| 7,564,476 B1 * | 7/2009 | Coughlan .............. H04N 7/147 348/14.08 |
| 9,973,551 B2 | 5/2018 | Ouyang et al. |
| 11,165,755 B1 | 11/2021 | Qian et al. |

(Continued)

FOREIGN PATENT DOCUMENTS

WO 2021101510 A1 5/2021

OTHER PUBLICATIONS

International Search Report and Written Opinion received for PCT Application No. PCT/US20233/036219, Feb. 19, 2024, 13 pages.

(Continued)

*Primary Examiner* — Amal S Zenati
(74) *Attorney, Agent, or Firm* — Shook, Hardy & Bacon L.L.P.

(57) ABSTRACT

Embodiments disclosed herein are directed to computing technology for programmatically sanitizing unwanted content that is shared in a meeting. The unwanted content may be sanitized in real-time and in a meeting presentation. In an implementation, the unwanted content is detected, and a determining a sensitivity mitigation action is determined for the unwanted content. The sensitivity mitigation action is applied to generate a modified presentation of a live meeting presentation such that aspects of the unwanted content are removed. A graphical user interface (GUI) tool is disclosed to enable users to control application of a sensitivity mitigation action. In this manner, embodiments disclosed herein facilitate complying with a privacy policy.

20 Claims, 11 Drawing Sheets

(56) References Cited

U.S. PATENT DOCUMENTS

| | | | |
|---|---|---|---|
| 11,392,709 | B2 | 7/2022 | Varerkar et al. |
| 2013/0266127 | A1 | 10/2013 | Schachter et al. |
| 2015/0138302 | A1* | 5/2015 | Sethi ........................ H04N 7/15 |
| | | | 348/14.07 |
| 2016/0092561 | A1 | 3/2016 | Liu et al. |
| 2019/0392176 | A1* | 12/2019 | Taron ..................... G06N 20/00 |
| 2021/0224754 | A1* | 7/2021 | Zarakas ............. G06Q 10/1095 |
| 2021/0385412 | A1 | 12/2021 | Matula et al. |
| 2022/0036708 | A1 | 2/2022 | Rey et al. |

OTHER PUBLICATIONS

"IBM Researchers Develop Shield to Mask Sensitive On-Screen Information", Retrieved From https://phys.org/news/2009-07-IBM-shield-mask-sensitive-on-screen.html, Jul. 9, 2009.

Goldsteen, et al., "Application-Screen Masking: A Hybrid Approach", In Journal of IEEE Software, vol. 32, Issue 4, Jul.-Aug. 2015, pp. 40-45, May 13, 2015.

International Preliminary Report On Patentability received for PCT Application No. PCT/US2023/036219, mailed on Jul. 10, 2025, 08 pages.

\* cited by examiner

MEETING INFORMATION SHARING PRIVACY TOOL

BACKGROUND

Certain people spend a significant amount of their time in meetings, presentations, and lectures, such as for school, pleasure, or work. Moreover, certain people are attending more meetings at a higher rate, as they are working remotely more often and thus have fewer unplanned interactions with co-workers, often communicating with others via meeting applications including time collaborating or working with teams or groups of people. In some instances, sensitive content is presented during the meeting. Consequently, certain meeting presentations are presented at or near real-time with sensitive content, or the meeting recording associated with meeting is uploaded or saved with the sensitive content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed toward technologies for improving the functionality of multimedia content generated or presented by computing applications accessible on user computing devices. In particular, this disclosure provides certain technologies to programmatically provide a modified meeting presentation that sanitizes an occurrence of unwanted content in the meeting. In one example, the modified meeting presentation is a version of the meeting presentation that has been altered, based on a sensitivity mitigation action being applied to at least partially remove the unwanted or otherwise sensitive content associated with the meeting. In one example, the sensitivity mitigation action is a modification applied to a meeting presentation, based on a comparison of aspects of the meeting. In this example, the comparison of aspects of the meeting indicates that the segment of the meeting associated with the aspects contains sensitive content. In another example, the sensitivity mitigation action is a modification applied to a segment of a meeting presentation, based on a comparison of aspects of the segment, based on aspects of different segments, and the like.

Embodiments described in the present disclosure are directed toward technologies for improving the functionality of multimedia content generated or presented by computing applications accessible on user computing devices. In particular, this disclosure provides technologies to programmatically determine aspects of a meeting or of a meeting presentation based on user-meeting data associated with the meeting presentation. In one embodiment, a first aspect corresponds to a visual feature of a segment and a second aspect corresponds to an audio feature of the segment. In one embodiment, the first aspect and the second aspect occur substantially concurrently (for example, across the same segment of the meeting presentation). Embodiments described in the present disclosure include determining and applying a sensitivity mitigation action based on a comparison of the first aspect and the second aspect. In one embodiment, the sensitivity mitigation action is applied to a segment of the meeting presentation having at least one of the first aspect or the second aspect. In one embodiment, the sensitivity mitigation action is determined based on a comparison of aspects of the same segment (or across different segments), relatedness between the segments, and the like. In one example, the relatedness is based on a meeting data feature for the segment and another meeting data feature for the other segment.

Embodiments described in the present disclosure include applying the sensitivity mitigation action to cause sensitive content to at least be partially removed either through altering, editing, obscuring, hiding, or removing visual or audio aspects of the meeting. In some embodiments, the sensitivity mitigation action is applied to a segment of the meeting presentation to produce a sensitivity-compliant segment. Thereafter, the meeting presentation or the meeting is provided with the sensitivity-compliant segment, thereby rectifying issues associated with the sensitive content initially being contained in the segment. In this manner, a modified meeting presentation can be generated to include the sensitivity-compliant segment.

In some embodiments, the operation of a computer application, such as a communications or video hosting application, is configured or modified to execute computer instructions for generating and presenting a graphical user interface (GUI) that includes a sensitivity control GUI element. In some embodiments, the sensitivity control GUI element is generated as an in-meeting control to empower a user to control the application of a sensitivity mitigation action in real-time during the meeting, or as a post-meeting control to empower a user to control the application of the sensitivity mitigation action after the meeting has concluded. An example, sensitivity control GUI element 306 employed as a post-meeting control is depicted in FIG. 3. In some embodiments, the sensitivity control GUI element includes an indication of a flagged candidate segment and any number of selectable controls selectable to control the application of a sensitivity mitigation action to the flagged candidate segment. For example, selection of or engagement with the selectable controls of the sensitivity control GUI element causes the sensitivity mitigation action to be applied or not be applied. In some embodiments, the GUI, such as GUIs 302, 402, and 502 of FIGS. 3, 4, and 5, respectively, includes additional selectable controls for refining application of the sensitivity mitigation action, such as controls for choosing a sensitivity mitigation action to apply; for selecting whether to save, distribute, or upload the revised version of the meeting presentation; and/or performing other post-processing operations, such as those disclosed herein and others.

Such disclosed technologies improve the user experience in any of a number of computer applications and platforms. Further, these technologies reduce computational resources and bandwidth associated with a user downloading and randomly playing back portions of a large file of the meeting presentation to assess sensitivity in search of a particular segment of the meeting presentation to manually remove because it contains sensitive content. For example, a user in search of a portion of the meeting presentation containing sensitive content will randomly play back many portions of the meeting in search of a target portion of the meeting, thereby expending local or distributed computational resources associated with servicing the user's manual requests for toggling to irrelevant portions of the meeting presentation. To make matters worse, even if a user manually is able to edit the meeting presentation, the user does not always understand the sensitive nature of the content she or he is presenting and therefore may fail to adequately remove sensitive content from the segment of the meeting presentation. As a result, computation resources may also be expended on further editing out more of the sensitive content, which was missed by the manual attempt by one user. Additionally or alternatively, to avoid bandwidth strains, embodiments disclosed herein support on-demand download of the segments of the meeting. For example, the meeting presentation can be cached, and the meeting presentation corresponding to a meeting can be downloaded and post-processed to determine and apply the sensitivity mitigation action during times of lower user activity and less computational resource consumption.

BRIEF DESCRIPTION OF THE DRAWINGS

Aspects of the disclosure are described in detail below with reference to the attached drawing figures, wherein.

DETAILED DESCRIPTION

Figure 1:
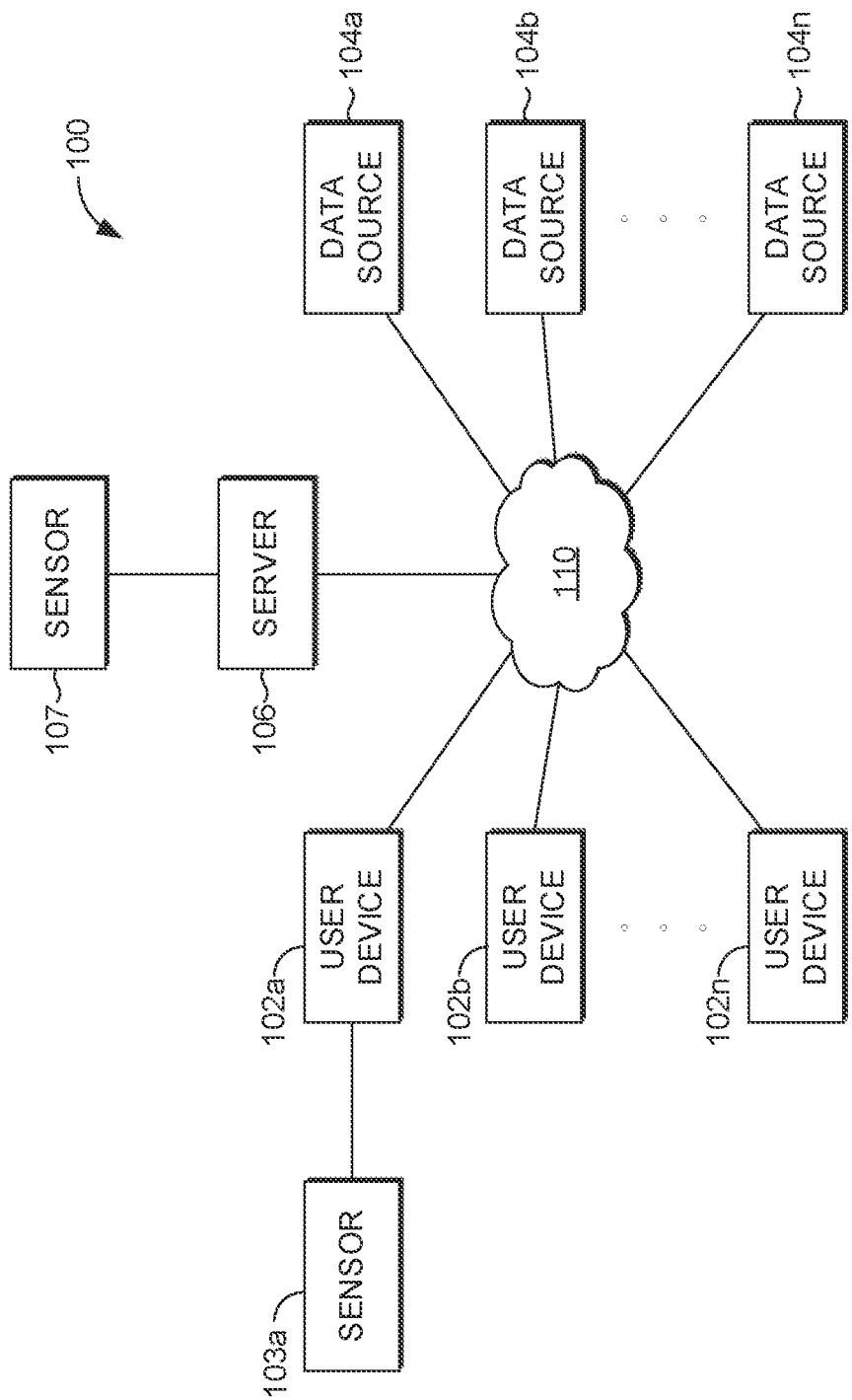
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. The method(s) or process(es) described herein may comprise a computing process that may be performed using any combination of hardware, firmware, and/or software. For example, various functions are carried out by a processor executing instructions stored in memory. In another example, the methods or processes are embodied as computer-useable instructions stored on computer storage media. In another example, the methods are provided by a stand-alone application, a service or hosted service (stand-alone or in combination with another hosted service), or a plug-in to another product, to name a few.

Embodiments of the present disclosure relate to technology for improving electronic communication technology and enhancing computing services for a user, to improve the generation of meeting-recorded content and tools for generating a modified meeting presentation that includes application of a sensitivity mitigation action that at least partially removes sensitive content contained in the meeting. In particular, the solutions provided herein include technologies to programmatically detect the likelihood of sensitive content being shared in a meeting. Additionally, certain solutions provided herein include technologies to determine and apply a sensitivity mitigation action to (for example, a segment of) a meeting presentation. In one example, the sensitivity mitigation action is applied in-meeting, such as near-real-time as the meeting is happening, or as a post-meeting operation, and is applied to prevent or minimize the sharing of the sensitive content. Additionally, certain solutions provided herein include technologies to programmatically generate and present a graphical user interface (GUI) empowering a user to control application of the sensitivity mitigation action either in-meeting or post-meeting.

In an example, as used herein, "meeting" refers to a gathering of one or more people that is at least partially hosted or supported by a computing application operating on a computing device, such as a meeting application, video conferencing application, or collaboration application, and for which a user interacts by way of their user devices or client computing device (sometimes referred to herein as mobile devices, laptops, desktops, computers, virtual-reality (VR) headsets, or user devices). In one example, the meeting includes a hybrid meeting where a portion of attendees are participating in-person, while another portion of attendees are participating via a client computing device as discussed above. For example, a meeting allows for meeting attendees to engage with each other or deliver content to other attendees at or near real-time. Computer application software supporting meetings may also support additional features, such as a chat, a recording control, screen sharing, and so forth. On the other hand, "meeting recording," in an example, refers to a recording of at least an aspect or portion of a meeting, such as an audio, video, or multimedia recording of the meeting. For example, a meeting recording corresponds to a stored copy of at least a portion of a meeting that has already occurred. For instance, a live meeting that is streaming to online users is recorded as the meeting is occurring. In one example, "meeting presentation content" or "meeting presentation" is inclusive of both the meeting recording and a live-meeting (for example, meeting presentation content that is streamed to online viewers), such that employing the embodiments disclosed herein to a meeting presentation includes employing the embodiments in association with or to a meeting recording and/or a meeting.

Although certain embodiments discussed herein are discussed as having a sensitivity mitigation action applied to a meeting recording, it should be understood that, in some embodiments, the sensitivity mitigation action is applied to a meeting at or near real-time to avoid presenting sensitive content while the meeting is taking place at or near real-time. Moreover, although certain embodiments are discussed in the context of removing sensitive content from a meeting presentation having video or images, it should be understood that the embodiments disclosed herein are applicable to meeting transcripts, documents, videos, or other types of media that may be shared in connection with a meeting.

In one example, a "segment of meeting presentation" or "segment" refers to a portion of meeting presentation, having a length of time defined between a start time and an end time. In one example, the length of time of the segment of the meeting presentation is less than the length of time of the entire meeting presentation. In one embodiment, the segment has a start time associated with a meeting time of the initiation of an utterance, a gap (for example, a portion of the meeting presentation during which no audio or no visual content is being provided), a change in topic, or a visual transition (for example, starting or ending visual content or transitioning slides in a presentation); and has an end time corresponding to a meeting time when the corresponding utterance, gap, topic, or visual transition ends, or a second and subsequent visual transition occurs. In one example, the ending or initiation is determined based on a change in sounds parameters (for example, speaker, frequency (or sound pitch), amplitude (or dynamics or loudness), wave form, wave duration, timbre (or tone color), and so forth) or visual parameters. In one embodiment, the content of the segment shares a common meeting data feature, such as an indication of: a gap, a speaker, a topic, a visual content, an audio content, contextual data, or user-inputs, or any other meeting data feature discussed herein. For example, a first segment of the meeting corresponds to a portion of the meeting during which a first speaker is speaking, a second segment of the meeting corresponds to a portion of the meeting during which a second speaker is speaking, and a third segment of the meeting presentation corresponds to a portion of the meeting during which audio gaps (or no audio) occurs. As another example, a first segment corresponds to an audio relating to a first topic, and a second segment corresponds to audio relating to a second topic.

While conducting the meeting, sensitive content can accidentally be shared to viewers or an audience. In one example, "sensitive content" refers to data that should be guarded from unauthorized access or unwarranted disclosure to maintain the information security of an individual, entity, or organization. Example sensitive content includes personally identifiable information (PII), such as educational information, financial information (for example, credit card numbers, banking information, tax forms, and credit reports); business information, such as intellectual property, trades secrets, consumer and supplier records, and plans for a merger; or classified information, such as government data, and the like. Sensitive content can be contained in audio or visual content (for example, a video, a document, an image, or any other tangible media) displayed during a meeting. In one example, sensitive content also refers to any subjective data that a user does not wish to share for any reason, such as embarrassment, reputational harm, and the like. In one embodiment, sensitive content is defined by a corporate, organizational, enterprise, state, or federal sensitivity policy (also called herein in one example, a "privacy policy") that is accessed to determine sensitive content that the meeting presentation may contain.

Figure 6A:
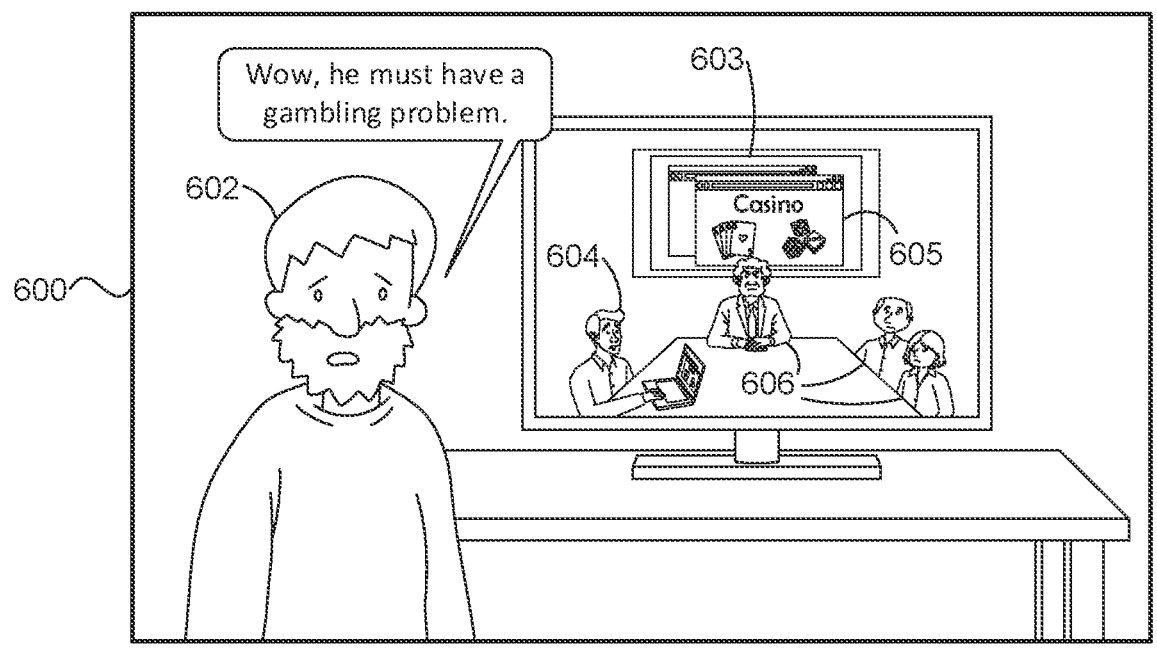
FIG. 6A depicts an example of a conventional user consumption of a meeting presentation that includes sensitive content.

By way of a non-limiting example and with reference to the cartoon 600 depicted in FIG. 6A, a presenter 604 can conventionally present content that is shared to a plurality of audience members. As illustrated, a presenter 604 presenting during a professional conference wishes to share one of their screens or windows 603 to present slides to enhance the effectiveness of delivering the meeting. However, while attempting to share their screen or window 603, the presenter 604 accidentally causes presentation of sensitive content 605, such as gambling activity associated with the presenter 604. Although the presenter 604 may quickly close the window to limit the amount of time the sensitive content 605 is displayed, certain viewers, such as the live viewers 606 and the online viewers or meeting-recording viewers 602 (viewing a meeting recording at a later time) could have identified the content that shows the gambling activity associated with the presenter 604. To make matters worse, using certain existing approaches, the meeting recording associated with the presentation is automatically saved, uploaded to a server, and/or distributed to electronic accounts associated with the meeting invitees or attendees, such as the live viewers 604 or the online viewers or meeting-recording viewers 602. Indeed, certain existing approaches fail to provide computing logic and infrastructure to automatically detect a likelihood of an occurrence of sensitive content and/or to generate a modified meeting presentation that has had a sensitivity mitigation action applied, which, in this example, would have at least partially removed the sensitive content (in this example, the gambling content). As used herein, in one example, "partially remove" means to remove, alter, edit, obscure, or hide one or more aspects of the segment containing the sensitive content, such that the sensitive content is not provided to meeting viewers, and can include, for example, only removing audio, visual content, and/or any other aspect of the meeting presentation.

Figure 6B:
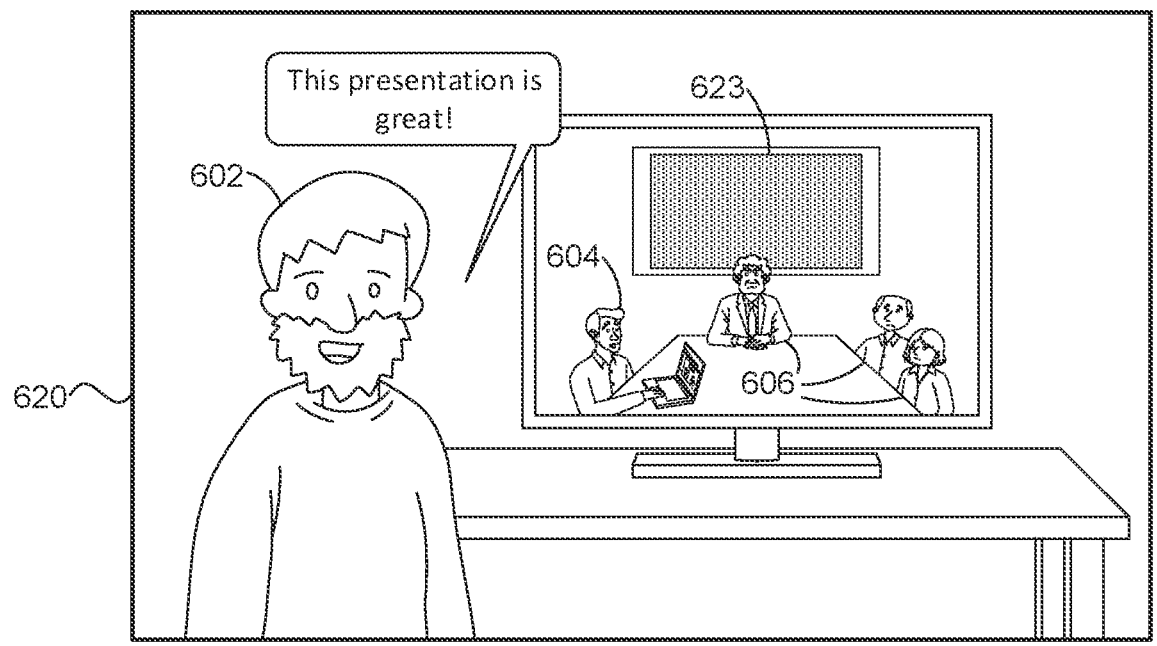
FIG. 6B depicts an example user consumption of a modified meeting presentation that includes a version of the meeting presentation of FIG. 6A that has been automatically modified to at least partially remove the sensitive content, in accordance with an embodiment of this disclosure.

To improve upon certain existing technology, certain embodiments described in the present disclosure identify, at or near real-time, sensitive content of the meeting presentation and determine a sensitivity mitigation action to be applied to the segment of the meeting presentation that contains the sensitive content. With reference to FIG. 6B, the depicted cartoon depicts an improved solution that would avoid or provide an improvement to the issues associated with cartoon 600 of FIG. 6A in which a presenter 604 accidentally presents and displays sensitive content 605. Instead of suffering the embarrassment of accidentally sharing sensitive content 605 to an audience of live viewers 604 and online or meeting-recording viewers 602, some embodiments disclosed herein at least partially remove sensitive content 605 from the meeting presentation. As depicted in cartoon 620, when the sensitive content 605 is presented during the meeting (such as when the presenter presents gambling content, as shown in this example) and/or meeting recording, the sensitive content is detected automatically. For instance, in one embodiment further described herein, a comparison of a first aspect of the meeting and a second aspect of the meeting, which occurs substantially concurrently with the first aspect, is employed to detect the sensitive content. In the example of FIG. 6B, a first aspect that comprises a visual aspect indicating gambling is compared with a second aspect occurring substantially concurrently with the first aspect. For instance, the second aspect comprises an audio aspect of the meeting discussion occurring while the first aspect (for example, the gambling content) is accidentally presented, or the second aspect comprises a visual aspect occurring prior to the first aspect. From the comparison, it is determined that the first aspect (for example, visual content indicating gambling) is not similar nor related to the second aspect (for example, the gambling content is not related to the audio of the meeting discussion or the prior visual content). Accordingly, the portion of the meeting comprising the first aspect is flagged as potentially containing sensitive content. A sensitive content mitigation action that includes removing visual aspects of sensitive content 605 (but maintaining the meeting audio unaltered) is applied to the segment of the presentation containing the sensitive content 605. In the cartoon 620, a modified meeting presentation 623 is generated, such that the modified meeting presentation removes the visual aspects associated with the sensitive content 605 by employing an embodiment disclosed herein. In one example, the system 200 discussed in FIG. 2 facilitates the removal of sensitive content at or near real time (for example, during the occurrence of the meeting), or during a post-processing operation after the meeting has concluded.

To facilitate removal of sensitive content, in one example, a computing device determines, for a segment, (1) a first aspect, such as an audio feature associated with the segment, and (2) a second aspect, such as a visual feature associated with the segment. In one example, the first aspect and the second aspect occur substantially concurrently. In one example, "aspect" of the meeting presentation refers to a parameter or feature of the meeting presentation. Example aspects of the meeting presentation include a visual aspect, an audio aspect, contextual data, or metadata associated with the meeting presentation and that are isolated, manipulated, analyzed, or removed. Based on a comparison of the first aspect and the second aspect, the computing device determines a sensitive action to be applied to the meeting presentation, for example, to the segment. For example, the first aspect includes audio features indicating that a product is being discussed, while the second aspect includes a visual feature indicating that gambling content has been displayed and shared to viewers. Alternatively or additionally, embodiments described in the present disclosure determine the sensitive action based on a comparison of aspects, such as meeting data features, for the segment containing the sensitive content and another segment, such as a neighboring segment, of the presentation. In this way, a presentation that is about gambling would not be detected as containing sensitive content, because the comparison of aspects from the various meeting segments would indicate a relatedness, such as a similarity. That is, multiple aspects of the meeting content would relate to gambling. In particular, conventional technologies that rely on keyword-based detection mechanisms (for example, automatically bleeping out swearing when a swear word is detected) would result in a false positive detection of sensitive content for a presentation on gambling, where gambling terms are included as keywords for the detection. However, certain embodiments of the technologies disclosed herein more accurately determine that meeting content regarding gambling is not sensitive content when it occurs in a meeting about gambling.

In one embodiment, the sensitivity mitigation action includes at least one of: altering the audio (for example, muting the audio, distorting the audio, playing background noise, bleeping, and the like), removing visual content, applying a mask overlay to the visual content (for example, a solid color such as white, black, green, and the like, a pattern such as static noise, lines, and the like, or an image such as a replacement image or an image indicating content is removed), blurring certain objects associated with the visual content, or any other suitable mitigation action to alter the meeting presentation to prevent viewers from viewing, listening to, consuming, or otherwise being able to identify sensitive content. Additionally, in one example, a GUI provides various controls that are selectable by a user to control in-meeting application of a sensitivity mitigation action. In this manner, applying a sensitive action, at or near real-time, to the meeting presentation reduces or eliminates exposure of sensitive content during a live meeting. In one example, the embodiments disclosed herein are performed during a latency period associated with streaming the live meeting, such that the sensitive content is removed from the live meeting at or near real-time. Accordingly, the exposure of sensitive content can be minimized or prevented from being shared both online and also via the audio/video (AV) presentation equipment of an in-person meeting, such as a screen or sound system of the meeting venue.

Alternatively, certain embodiments disclosed herein provide post-processing logic and infrastructure to control application of the sensitive action. Continuing the example above, after the meeting ends, a user, such as the presenter or an authorized user, receives an indication of flagged candidate segments of the meeting presentation automatically identified as containing sensitive content. In one example, the "flagged candidate segments" refers to a segment identified as containing sensitive content and for which a corresponding sensitivity mitigation action is determined and to be applied. In the aforementioned example, the flagged candidate segments include the segment during which the gambling content was accidentally presented by the presenter. In one example, the flagged candidate segments are provided with the sensitivity mitigation action applied. In another example, the flagged candidate segments are provided without the sensitivity mitigation action applied; instead, the sensitivity mitigation action is applied after confirmation is received via a user input, via an example graphical user interface (GUI) 302, 402, and 502, to the sensitivity control GUI element, such as the sensitivity control GUI element 306 depicted in FIG. 3. To empower the user with computation logic to facilitate control application of the sensitive action, in one example, the user is presented with a GUI that allows a user to provide an input indication of a selection to confirm or decline application of sensitivity mitigation action. In one embodiment, the GUI 302, 402, and 502 (of FIGS. 3, 4, and 5, respectively) allows the user to modify the sensitivity mitigation action, for example, to cause the flagged candidate segment to be altogether removed from the modified meeting presentation instead of merely presented with an audio or visual altering effect of the sensitivity mitigation action.

Such disclosed technologies improve the user experience in any of a number of computer applications and platforms. Further, these technologies reduce computational resources and bandwidth associated with a user downloading and playing back random portions of a large file of the meeting presentation in search of a particular segment of the meeting presentation to attempt to manually remove. For example, a user in search of a segment of the meeting presentation containing sensitive content will randomly play back many portions of the meeting in search of a target portion of the meeting, thereby expending local or distributed computational resources associated with servicing the user's manual requests for toggling to erroneous and irrelevant portions of the meeting presentation. To make matters worse, the segment of the meeting presentation containing sensitive content often is inadequately edited out; as a result, additional computation resources may also be expended on properly editing out more of the sensitive content, which was missed by the manual attempt by the user. Additionally or alternatively, to avoid bandwidth strains, embodiments disclosed herein support on-demand download of the segments of the meeting. For example, the meeting recording can be cached, and the meeting recording corresponding to a meeting can be downloaded and post-processed to determine and apply the sensitivity mitigation action during times of lower user activity and less computational resource consumption.

Overview of Technical Problems, Technical Solutions, and Technological Improvements As previously described, people spend significant time in meetings communicating with other people or collaborating in teams, and it can be helpful to provide a user with a modified meeting presentation that has had a sensitivity mitigation action applied. For example, while a meeting is occurring or after the meeting has concluded, it would be helpful for a sensitivity mitigation action to be applied to a segment of the meeting presentation to at least partially remove sensitive content. Similarly, in some instances, it would be helpful for a meeting recording to be post-processed to identify sensitive content, to apply a sensitivity mitigation action, to confirm or control application of the sensitivity mitigation action, and/or to upload or distribute a modified meeting presentation that includes the sensitivity mitigation action having been applied.

However, as anyone who has ever listened to recorded meetings can attest, sensitive content is sometimes accidentally shared by a user during the meeting with little to no recourse for rectifying the issue. Indeed, certain existing conventional technologies fail to provide computing logic and infrastructure to post-processing the meeting recording by applying a sensitivity mitigation action to rectify the issue. Additionally, certain existing conventional technologies fail to provide computing logic and infrastructure for rectifying the erroneous sharing of content at or near real-time. For example, a presenter during a meeting accidentally displays sensitive content that should not be viewed by audience (for example, the live audience remotely accessing the meeting through a web browser on their user device or a viewer viewing a meeting recording of the meeting). Although the presenter may try to quickly close the sensitive content or change display to other content, certain viewers could have identified the content that shows the sensitive content. To make matters worse, using certain existing approaches, the meeting presentation associated with the presentation is automatically saved, uploaded to a server, and/or distributed to electronic accounts for viewing by additional users. Indeed, certain existing approaches fail to provide computing logic and infrastructure to generate a modified meeting presentation that has had a sensitivity mitigation action applied, which, in this example, would have visually or auditorily altered the meeting presentation to remove or rectify the sensitive content (in the above-referenced example, the gambling content).

Although certain software exists for editing videos, this editing software must rely on a user to manually determine the occurrence of sensitive content, which requires a user to have knowledge that sensitive content was shared in a meeting recording and remember when it was shared, or, alternatively the user must manually locate sensitive content, such as by watching or navigating the meeting recording to identify the sensitive content. Then the editing software requires the user to manually remove the sensitive content. Moreover, the editing software may be an entirely separate software from the meeting hosting software, thereby requiring users to be familiar with two separate software applications that requires a higher level of skill and time to manually edit a video. Further compounding this problem, many companies and organizations do not have the computing resources in place to automatically edit video based on a sensitivity policy and further allow users to manually edit an ever-increasing number of videos in an efficient manner. The problems of the required editing times, skill, and computational resources needed to manually edit meeting videos is further exacerbated due to the increasing number of online meetings that many people in a hybrid-remote working environment are facing. Moreover, many users who miss a meeting due to a conflict, prefer to watch the meeting as soon as possible so that they are caught up. But these users are unable to watch the meeting recording until the manual editing of the meeting content has been completed.

Accordingly, automated computing technology for programmatically determining, surfacing, and/or utilizing user-meeting data to (1) determine a sensitivity mitigation action for a meeting presentation, (2) generate a modified meeting presentation that has the sensitivity mitigation action applied, and (3) generate a GUI for empowering a user to control application of the sensitivity mitigation action, as provided herein, can be beneficial for enabling improved computing applications and an improved user computing experience. Further, embodiments of this disclosure address a need that arises from a large scale of operations created by software-based services that cannot be managed by humans, such as the manual editing of an ever-increasing quantity of video content. The actions/operations described herein are not a mere use of a computer, but address results of a system that is a direct consequence of software used as a service offered in conjunction with user communication services hosted across a variety of platforms and devices. Further still, embodiments of this disclosure enable an improved user experience across a number of computer devices, applications, and platforms at least due to the automated and customizable meeting presentation capabilities described herein. Further still, embodiments described herein enable certain sensitivity mitigation actions to be applied to (for example, a segment of) a meeting presentation without requiring computer tools and resources for a user to manually perform operations to produce this outcome with similar levels of accuracy and efficiency. For example, even if a user wanted to manually determine a sensitivity mitigation action to be applied, certain existing technologies do not allow for the automatic or semi-automatic application of a sensitivity mitigation action based on determination of a segment of the meeting presentation that has sensitive content. In this way, some embodiments, as described herein, reduce or eliminate a need for certain databases, data storage, and computer controls for enabling manually performed steps by a person, to search, identify, assess, view a video, and configure (for example, by hard-coding) manual operations to be applied to random portions of a meeting presentation, thereby reducing the consumption of computing resources, such as those associated with running an entire video so that a person can manually try to identify a portion of the meeting that has sensitive content, determine an appropriate rectifying measure, and then apply the rectifying measure.

Additional Description of the Embodiments

Turning now to FIG. 1, a block diagram is provided showing an example operating environment 100 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that are implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Among other components not shown, example operating environment 100 includes a number of user computing devices, such as: user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 1000 illustrated in FIG. 10, for example. In one embodiment, these components communicate with each other via network 110, which includes, without limitation, one or more local area networks (LANs) and/or wide area networks (WANs). In one example, network 110 comprises the internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment, such as the distributed computing device 1000 in FIG. 10. For instance, server 106 is provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a and 102b through 102n are the type of computing device described in relation to FIG. 10 herein. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

Data sources 104a and 104b through 104n may comprise data sources and/or data systems, which are configured to make data available to any of the various constituents of operating environment 100 or system 200 described in connection to FIG. 2. For instance, in one embodiment, one or more data sources 104a and 104b through 104n provide (or make available for accessing), to meeting-data collection component 210 of FIG. 2, user-meeting data. Data sources 104a and 104b through 104n may be discrete from user devices 102a and 102b through 102n and from server 106 or may be incorporated and/or integrated into at least one of those components. In one embodiment, one or more of data sources 104a and 104b through 104n comprise one or more sensors, which are integrated into or associated with one or more of the user device(s) 102a, 102b through 102n or server 106. Examples of data made available by data sources 104a, 104b through 104n are described further in connection to meeting-data collection component 210 of FIG. 2.

Figure 2:
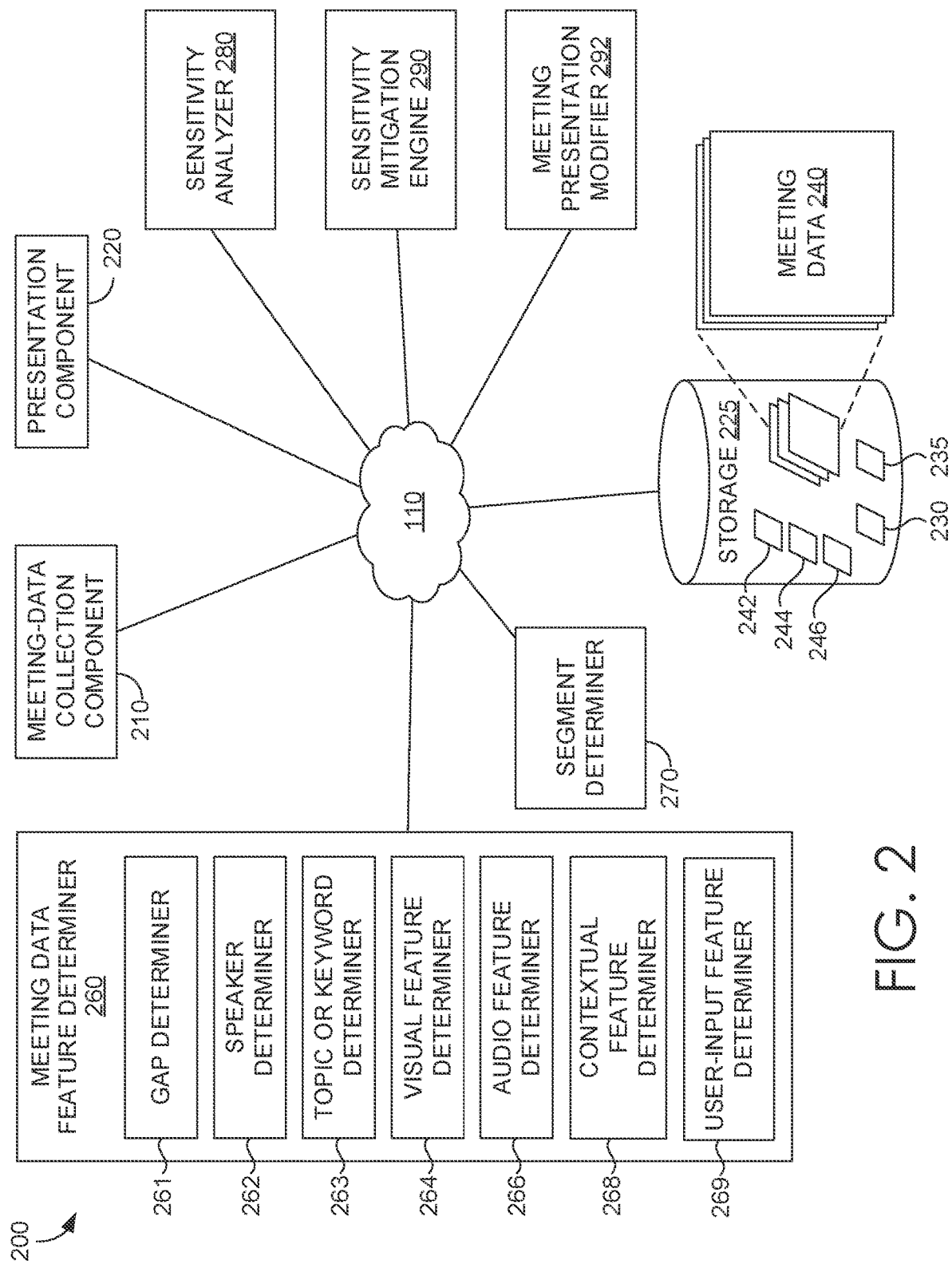
FIG. 2 is a diagram depicting an example computing architecture suitable for implementing aspects of the present disclosure.

Operating environment 100 can be utilized to implement one or more of the components of system 200, described in FIG. 2, including components for collecting user-meeting data; determining meeting data features, such as a gap, a speaker, a topic or keyword, a visual feature, an audio feature, contextual feature, or a user-input feature; determining segments of the meeting presentation; analyzing content to identify sensitive content; determining and applying a sensitivity mitigation action; generating a modified meeting presentation; and/or presenting a GUI to facilitate user consumption of the modified meeting presentation. Operating environment 100 can also be utilized for implementing aspects of methods 700, 800, and 900 in FIGS. 7, 8, and 9, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that are implemented as discrete or distributed components or in conjunction with other components, and in any suitable combination and location. In one example, the computing device of FIG. 10 and the distributed computing devices of FIG. 11 perform aspects of the system 200 of FIG. 2.

Example system 200 includes network 110, which is described in connection to FIG. 1, and which communicatively couples components of system 200. In the illustrated embodiment, the system 200 includes meeting-data collection component 210; presentation component 220; storage 225 storing meeting data 240, user accounts and devices 242, user-meeting data 244, and user configurations/feedback 246; meeting data feature determiner 260; segment determiner 270; sensitivity analyzer 280; sensitivity mitigation engine 290; and meeting presentation modifier 292. In some embodiments, meeting data feature determiner 260 (including its subcomponents 261, 262, 263, 264, 266, 268, and 269), segment determiner 270, sensitivity analyzer 280, sensitivity mitigation engine 290, meeting presentation modifier 292, meeting-data collection component 210, and presentation component 220 are embodied as compiled computer instructions or functions, program modules, computer software services, or an arrangement of processes carried out on one or more computer systems, such as distributed computing device 1100, described in connection to FIG. 11.

In one embodiment, the functions performed by components of system 200 are associated with one or more computer applications, services, or routines, such as an online meeting application, a video-viewing application, a communication or collaboration application, or an organizational explorer application. The functions may operate to determine, without limitation, segments, a sensitive content, a sensitivity mitigation action, and/or a modified meeting presentation based at least on meeting data 240. In particular, certain applications, services, or routines operate on one or more user devices (such as user device 102a) or servers (such as server 106). Moreover, in some embodiments, these components of system 200 are distributed across a network, including one or more servers (such as server 106) and/or client devices (such as user device 102a) in the cloud, such as described in connection with FIG. 11, or reside on a user device, such as user device 102a. Moreover, these components, functions performed by these components, or services carried out by these components may be implemented at appropriate abstraction layer(s) such as the operating system layer, application layer, hardware layer, and the like, of the computing system(s). Alternatively, or in addition, the functionality of these components and/or the embodiments described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), and so forth. Although the functionality is described herein with regard to specific components shown in example system 200, it is contemplated that, in some embodiments, functionality of these components is shared or distributed across other components.

Continuing with FIG. 2, meeting-data collection component 210 is generally configured to access or receive (and in some cases also identify) meeting data 240, including data associated with a meeting or data associated with a meeting presentation from one or more data sources, such as data sources 104a and 104b through 104n of FIG. 1; user accounts and devices 242; user-meeting data 244, which may include data associated with a user (such as a user's pattern of viewing and engaging with media content or a user's data from a productivity application like an electronic calendar); and user configurations/feedback 246. In some embodiments, meeting-data collection component 210 is employed to facilitate the accumulation of data of a particular meeting, or data of a particular user or group (or in some cases, a plurality of users including crowdsourced data) for meeting data feature determiner 260 or its subcomponents; segment determiner 270; sensitivity analyzer 280; sensitivity mitigation engine 290; and meeting presentation modifier 292. In one embodiment, the data is received (or accessed), and optionally accumulated, reformatted, and/or combined, by meeting-data collection component 210 and stored in one or more data stores, such as storage 225, where it is available to other components of system 200. For example, the meeting data 240 is stored in storage 225 and/or associated with user accounts and devices 242, user-meeting data 244, and user configurations/feedback 246. In some embodiments, any personally identifying data (for example, user data that specifically identifies particular users) is either not uploaded or otherwise provided from the one or more data sources 104, is not permanently stored, is de-identified, and/or is not made available to other components of system 200. In addition or alternatively, a user is able to opt into or out of certain services provided by the technologies described herein and/or select which meeting data 240 or user-meeting data 244, and/or which sources of meeting data 240 or user-meeting data 244 are to be captured and utilized by these technologies.

Meeting data 240, in one example, comprises any information that is related to a meeting presentation, and is generalized across users. User-meeting data 244, in one example, comprises any information that is related to a person such as that person's preferences, including interactions during a meeting. In one example, user-meeting data 244 refers to a combination of meeting data 240 and user data, such as user accounts and devices 242 and user configurations/feedback 246. However, in some implementations, user-meeting data 244 may also only include meeting data 240 or only include user data, such as user accounts and devices 242 and user configurations/feedback 246. Meeting data 240 and/or user-meeting data 244 may be received from a variety of sources and available in a variety of formats. By way of example and without limitation, meeting data 240, user accounts and devices 242, user-meeting data 244, or user configurations/feedback 246 comprises at least one of: audio information (for example, an audio file having a recording of sound and spoken content from the meeting); transcript information (for example, a document having text that has been extracted out of a meeting based on audio of the meeting and/or a chat of the region); contact information (for example, email, instant message, phone, and so forth associated with meeting attendees or meeting invitees, and can also specify a person's communication preferences); location information (for example, a person's current location or location of a particular office where they work); presence; user-related activity, which may comprise activity relevant to a user or group of users, such as communications information (for example, past e-mail, meetings, chat sessions, communication patterns or frequency, information about a user or other meeting attendees/invitees that the user had a meeting with or has an upcoming meeting with, or information about communications between a group member and one or more users), or files accessed (for example, a file created, modified, or shared), social media or online activity (such as a post to a social-media platform or website); subscription information; information regarding topics of interest to a user; other user-related activity that may be determined via a user device (such as user device 102a of FIG. 1); task-related information (for example, an outstanding task that the user has with regard to a meeting or outstanding tasks that meeting attendees have with respect to the user); information about a group or group member that they may choose to share (for example, birthday, anniversary, and so forth); preferences regarding sensitivity information; information in common with the user (for example, common project teams, work groups, backgrounds, education, interests, or hobbies); and/or any other suitable information. Indeed, additional examples of user-meeting data are described herein.

In some embodiments, user-meeting data 244 received via meeting-data collection component 210 is obtained from a data source (such as data source 104*a* in FIG. 1, which, in one example, corresponds to a meeting hosting site, a social networking site, a professional networking site, a corporate network, an organization's intranet or file share, or other data source containing user-meeting data) or determined via one or more sensors (such as sensors 103*a* or 107 of FIG. 1), which are on or associated with one or more user devices (such as user device 102*a*), servers (such as server 106), and/or other computing devices. As used herein, a sensor may include a function, routine, component, or combination thereof for sensing, detecting, or otherwise obtaining information such as user-meeting data 244 from a data source 104*a*, and may be embodied as hardware, software, or both. By way of example and without limitation, user-meeting data 244 includes data that is sensed, detected, or determined from one or more sensors (referred to herein as sensor data), such as location information of mobile device(s), properties or characteristics of the user device(s), user-activity information (for example: app usage; online activity; searches; voice data such as automatic speech recognition; activity logs; communications data, including calls, texts, chats, messages, and emails; document comments; website posts; other meeting data associated with communication events, including user history, session logs, application data, contacts data, calendar and schedule data), notification data, social-network data, e-commerce activity, user-account(s) data (which may include data from user preferences or settings associated with a personalization-related application, a personal assistant application or service, an online service or cloud-based account such as Microsoft 365, an entertainment or streaming media account, a purchasing club or services); global positioning system (GPS) data; other user device data (which may include device settings, profiles, network-related information, payment or credit card usage data, or purchase history data); other sensor data that is sensed or otherwise detected by a sensor (or other detector) component(s), including data derived from a sensor component associated with the user (including location, motion, orientation, position, user-access, user-activity, network-access, user-device charging, or other data that is capable of being provided by one or more sensor components); data derived based on other data (for example, location data that can be derived from Wi-Fi, cellular network, or IP address data), and nearly any other source of data that is sensed, detected, or determined as described herein.

User-meeting data 244, particularly in the form of context data or contextual information regarding a particular user, can be received by meeting-data collection component 210, for example, from the contextual feature determiner 268, from one or more sensors, and/or from computing devices associated with the user. In one embodiment, the contextual feature determiner 268 determines the contextual data or contextual information. In some embodiments, meeting-data collection component 210, meeting data feature determiner 260 or its subcomponents, segment determiner 270, sensitivity analyzer 280, sensitivity mitigation engine 290, and meeting presentation modifier 292 determine interpretive data from any data in the storage 225, such as the user-meeting data 244. In one example, interpretive data corresponds to data utilized by the components or subcomponents of system 200 that comprises an interpretation from processing raw data, such as a transcript extracted from raw audio from the meeting presentation, or topic information interpreted from a meeting presentation, such as a chat of a meeting, a transcript, and so forth. Interpretive data can be used to provide context to meeting data 240, user accounts and devices 242, user-meeting data 244, or user configurations/feedback 246, which can support determinations or inferences carried out by components of system 200. Moreover, it is contemplated that some embodiments of the disclosure utilize user-meeting data 244 alone or in combination with interpretive data for carrying out the objectives of the subcomponents described herein. It is also contemplated that, in some instances, certain meeting data 240, user accounts and devices 242, user-meeting data 244, or user configurations/feedback 246 is processed by the sensors or other subcomponents of meeting-data collection component 210 not shown, such as for interpretability by meeting-data collection component 210. Embodiments described herein are not limited to processed data and may include raw data or a combination thereof, as described above.

In some respects, meeting data 240, user accounts and devices 242, user-meeting data 244, and user configurations/feedback 246 are provided in meeting data streams or signals. In one example, a "signal" refers to a feed or stream of data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a calendar service, an email account, a credit card account, or other data sources. In some embodiments, meeting-data collection component 210 receives or accesses data continuously, periodically, as it becomes available, or as needed. In some embodiments, user-meeting data 244, which includes data indicative of the user's interactions during a meeting or while streaming a recording of the meeting, and which is received by meeting-data collection component 210, is stored in storage 225.

Continuing with FIG. 2, embodiments of meeting data feature determiner 260 determine a meeting data feature. In one embodiment, the meeting data feature determiner 260 determines the meeting data feature for a segment determined by the segment determiner 270. In another embodiment, the meeting data feature determiner 260 determines the meeting data feature and provides the meeting data feature for the segment determiner 270 to determine a segment. As described above, in one example, the meeting data feature is specific to a segment or a meeting presentation, is shared across users, or is generic across users. For example, the meeting presentation has similar meeting data features for the various users who view or listen to the meeting presentation. Embodiments of meeting data feature determiner 260 determine the meeting data feature based on: data associated with the meeting presentation; data associated with a particular user, such as a user interacting (for example, inputting text such as a chat message, uttering a voice command, making a selection, or another user interaction) via a GUI during the meeting or after the meeting while viewing the meeting presentation or other meeting presentations (such as a related meeting presentation that is part of a larger series of meeting presentations); or a combination thereof. In one embodiment, meeting data feature determiner 260 is provided with data, about a particular user and/or data about the meeting presentation, determined from the user data stored in the storage 225, received from meeting-data collection component 210, or received from meeting data 240, user accounts and devices 242, user-meeting data 244, or user configurations/feedback 246. In one example, user-meeting data 244 associated with a particular user and/or meeting is utilized to determine that user's context or indicate that user's intent, as described herein, such that a meeting data feature is determined by meeting data feature determiner 260 using this user-meeting data 244 and based on the user's context or intent.

Some embodiments of meeting data feature determiner 260 utilize meeting data feature determination logic 230 to determine a meeting data feature to provide the segment determiner 270, the sensitivity analyzer 280, the sensitivity mitigation engine 290, and/or the meeting presentation modifier 292. In one embodiment, meeting data feature determination logic 230 comprises computer instructions including rules, conditions, associations, predictive models, classification models, or other criteria for, among other operations, determining a meeting data feature (determined by the segment determiner 270), indexing the segments, or contextualizing the segments for a user, and so forth. Meeting data feature determination logic 230 may take different forms, depending on the particular information items being determined, contextualized, or processed for relatedness, and/or based on user-meeting data or data indicating a context. For example, meeting data feature determination logic 230 comprises any suitable rules, such as Boolean logic, various decision trees (for example, random forest, gradient boosted trees, or similar decision algorithms), conditions or other logic, fuzzy logic, neural network, finite state machine, support vector machine, machine-learning techniques or models, or combinations of these to determine (or facilitate determining) the meeting data feature according to embodiments described herein.

Figure 3:
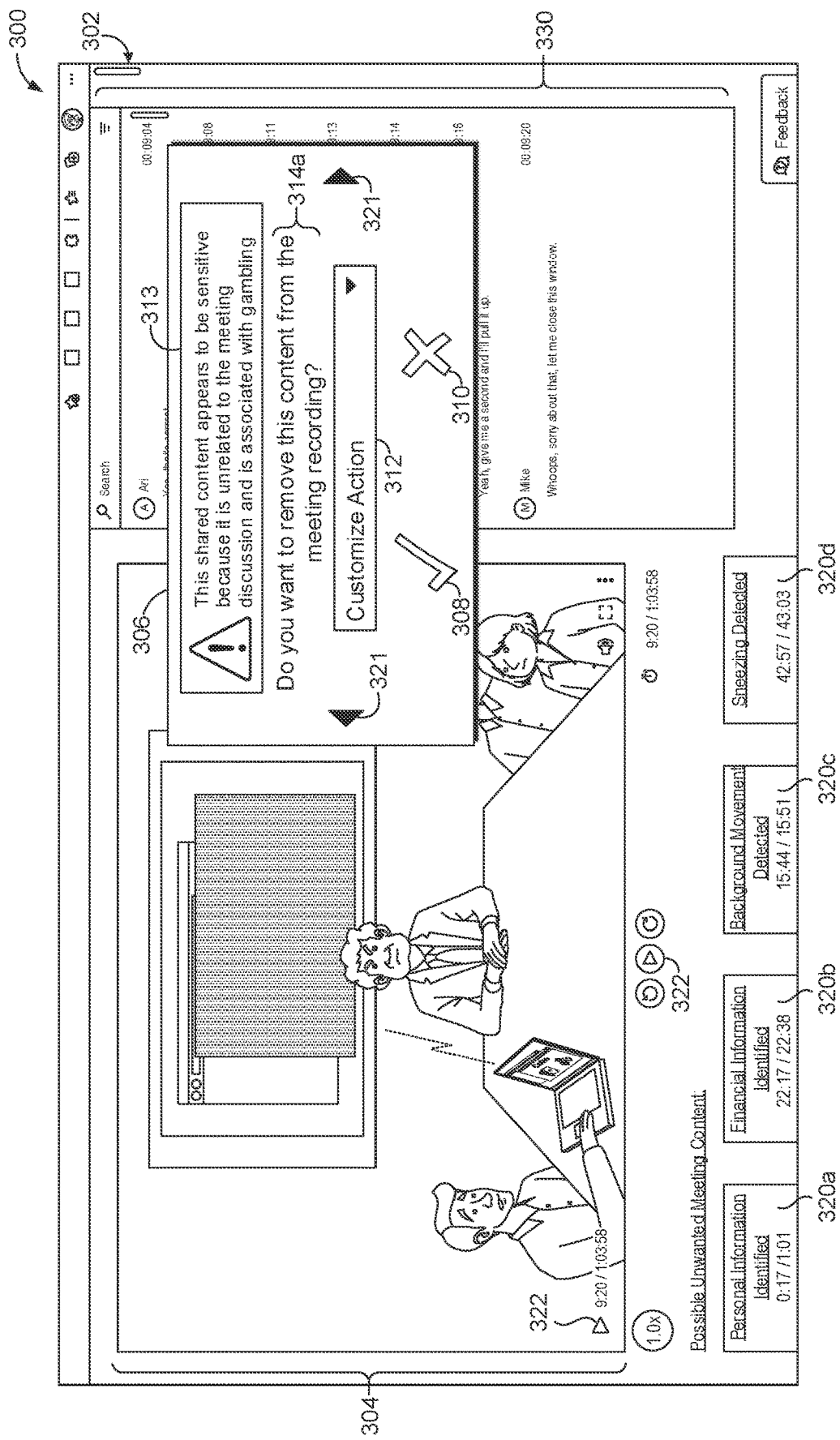
FIG. 3 illustratively depicts an example schematic screenshot from a personal computing device showing aspects of an example graphical user interface, in accordance with an embodiment of the present disclosure.
Figure 4:
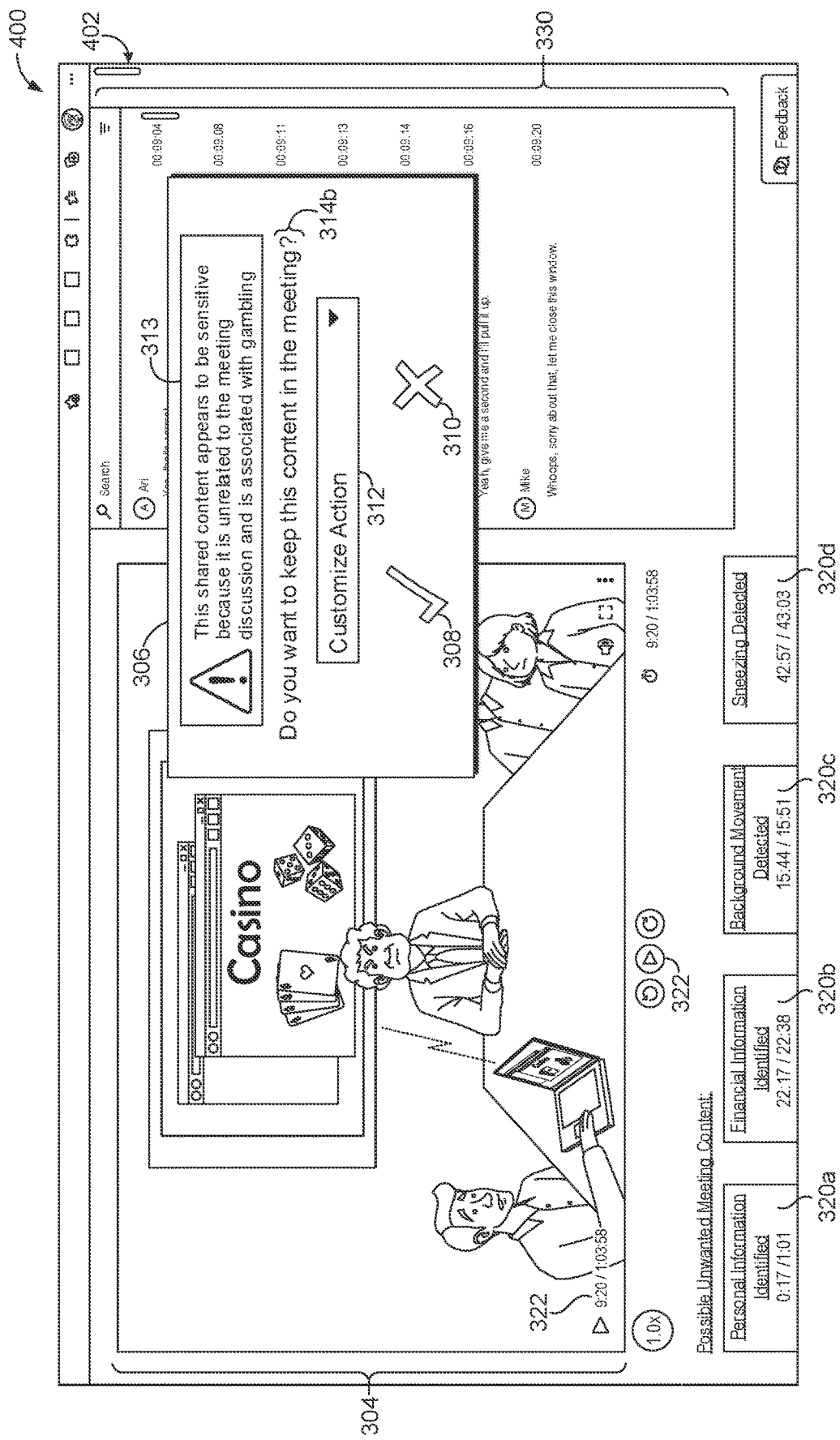
FIG. 4 illustratively depicts an example schematic screenshot from a personal computing device showing aspects of an example graphical user interface, in accordance with an embodiment of the present disclosure.

In some embodiments, the meeting data feature determiner 260 indexes and stores (in storage 225) the meeting data features, for example, as meeting data 240, to facilitate other components of the system 200 in retrieving the meeting data features. In this manner, the segment determiner 270 can determine the segment; the sensitivity analyzer 280 can determine sensitive content; the sensitivity mitigation engine 290 can determine a sensitivity mitigation action to rectify the sensitive content; and/or the meeting presentation modifier 292 can generate a modified meeting presentation that applies the sensitivity mitigation action. In one embodiment, the meeting data feature is indexed and used to determine sensitive content. For example, as illustrated in FIGS. 3 and 4, gambling content, such as the depicted gambling content, is identified and a sensitivity mitigation action for removing the sensitive content is determined. In the example depicted in FIG. 5, the sensitivity mitigation action can be customized to control the alterations to the meeting presentation to generate the modified meeting presentation.

In some embodiments, the meeting data feature determined by meeting data feature determiner 260 (which is determined using meeting data feature determination logic 230) is based on explicit or inferred information about the meeting, the meeting presentation, and/or the user(s). For example, meeting data feature determination logic 230 includes logic specifying instructions for detecting explicit information about the meeting presentation; determining an event time of the explicit information; or similarly for inferring a meeting data feature based on meeting data 240, user accounts and devices 242, user-meeting data 244, and user configurations/feedback 246. Without limitation, examples of explicit information about the meeting presentation can comprise a general topic of the meeting, a list of speakers from the meeting, a list of topics discussed, languages in which the meeting was delivered, and so forth. Examples of inferred data associated with the meeting data feature comprise a relevancy of the meeting to the user or to a role associated with the user (and shared with other users), or the frequency, rate, or count of views of the meeting presentation.

In some embodiments, the meeting data feature determiner 260 associates a meeting data feature to a corresponding segment or set of segments. In one embodiment, meeting data features are associated if they occur substantially concurrently. In one example, occurring "substantially concurrently" refers to the meeting data features or users features occurring or at least partially occurring during similar ranges of times. For example, a first meeting data feature occurs concurrently with a second meeting data feature if an amount of the first meeting data feature (expressed as a percentage, ratio, threshold number, and so forth, such as 50%, 60%, 70%, 80%, 90%, 100% and the like) occurs at the same time as the second meeting data feature. In one embodiment, associating the meeting data feature to a segment or set of segments includes determining a start time and an end time associated with the meeting data feature; determining whether the start time and the end time associated with the first meeting data feature overlaps with a start time and an end time associated with the first segment; and based on a level of overlap (expressed as a percentage, ratio, threshold number, and so forth) between (1) the start time and the end time associated with the first meeting data feature and (2) the start time and the end time associated with the first segment, correlating the first meeting data feature with the first segment. In some embodiments, a first segment may be related to the second segment based on proximity to each other. For example, the embodiments discussed herein are applicable to a first segment that is adjacent, sequential, proximate, or any position relative to a second segment.

Some embodiments of meeting data feature determination logic 230 comprise a plurality of logic for classifying various types of meeting data features to determine the type(s) or category(ies) of a meeting data feature, and/or include corresponding logic for determining the relatedness of each type/category of meeting data features. By way of example and without limitation, categories of meeting data features determined by meeting data feature determiner 260 (which employs meeting data feature determination logic 230, in some embodiments) can comprise: information that a gap has occurred; information that a particular speaker is speaking; information of a topic of interest or keywords or phrases being identified, such as the words or phrases "important," "crucial," "emphasize," "please listen," or "dollars," or any word inferred to be relevant to a user or group of users; information regarding video aspects of the meeting; information regarding audio aspects of the meeting; information regarding a context of the meeting; information regarding user inputs; and the like. Additionally, in one example, the meeting data features (or another category) are programmatically generated, ranked, or determined for relevance to the user, a group of users, or an organization or enterprise, according to the meeting data feature determination logic 230. For example, a meeting data feature is automatically determined by detecting a gap, a mention of a particular person (for example, a recently fired employee), the start of the session of a particular speaker, a keyword mention, a visual feature or change thereof, an audio feature or change thereof, contextual information, or a user input, and the like. One example illustratively depicting identification of sensitive content and generation of a sensitivity control GUI element 306 of FIG. 3 or 4 that receives a user input accepting or rejecting a sensitivity mitigation action that is determined based on meeting data features determined by the meeting data feature determiner 260 (which uses meeting data feature determination logic 230) is provided in FIG. 3. However, it should be understood that the sensitivity control GUI element 306 of FIGS. 3 and 4 may also be generated additionally or alternatively based on other meeting data features.

Further, in some embodiments, the dedicated subcomponent utilizes meeting data feature determination logic 230 that is specific for classifying the meeting data feature to determine the particular category of the meeting data feature. For instance, as shown in example system 200, meeting data feature determiner 260 comprises gap determiner 261, speaker determiner 262, topic/keyword determiner 263, visual feature determiner 264, audio feature determiner 266, contextual feature determiner 268, and user-input feature determiner 269. In one embodiment, the meeting data feature is determined by the subcomponents of the meeting data feature determiner 260, as described herein.

Gap determiner 261, in general, is responsible for determining portions of the meeting presentation that are silent or in which visual content is not presented. In the context of meeting presentations that include solely audio, the gap corresponds to the non-tonal portions of the analyzed audio and can be caused by breath sounds, rests, or corresponds to trigger-filler words, such as "um," "you know," "uh," and "like," to name a few. For example, and without limitations, gaps include the portion of the meeting during which speakers transition, meeting breaks take place, technical audio difficulties occur, visual content ceases to be displayed, and so forth.

Embodiments of gap determiner 261 determine changes in sound parameters of audio of the meeting presentation. Example sound parameters include the frequency, amplitude, wave form, wave duration, and so forth. In musical terms, the sound parameters include dynamics (loudness), sound pitch (or frequency), timbre (tone color), and so forth. In one example, the gap determiner 261 determines changes in sound parameters that exceed or do not exceed a threshold value of change expressed as a fraction, ratio, percent, and so forth. Embodiments of the gap determiner 261 determine a start time at which the change in sound parameter was determined. In one embodiment, the gap determiner 261 determines whether the change in the sound parameter corresponds to an utterance or a gap. Thereafter, in one example, the gap determiner 261 determines another change in a sound parameter and determines the corresponding end time at which the other change in the sound parameter is determined. In one example, the duration of the gap or utterance corresponds to the time elapsed between the determined start time and end time corresponding to respective changes in sound parameters.

In one example, the determined gap is passed to the segment determiner 270, such that the gap determined by the gap determiner 261 is automatically generated as a segment of the segment determiner 270. In another example, the segment determiner 270 receives the determined gap and further evaluates the gap for sound to verify and/or validate that the gap is indeed a gap (that does not include audio or sound). In one embodiment, the gap determined by the gap determiner 261 is communicated to the sensitivity analyzer 280 that determines whether the gap should be classified as having sensitive content. In another embodiment, the gap determined by the gap determiner 261 is communicated to the sensitivity mitigation engine 290 that determines a sensitivity mitigation action for the gap, and meeting presentation modifier 292 generates a modified meeting presentation based on the embodiments discussed herein.

Speaker determiner 262, in general, is responsible for determining the identity of the speakers presenting content during the meeting or an author or creator of content included during the meeting. For example, a speaker might include a person who spoke for more than a threshold amount of time, such that those speakers who do not speak for a duration exceeding the threshold amount of time are not classified as speakers and instead are classified as people interrupting a meeting by asking questions or clarifying a point made by the speaker. Embodiments of speaker determiner 262 can process user-meeting data 244 associated with the meeting presentation to determine a speaker. In some embodiments, user-meeting data 244 (such as communications data from a meeting presentation (for instance, patterns of communication by the various speakers), location of the meeting, relationship data indicative of a relationship, between the speaker and the user, determined from an organizational chart or contacts list, or other user-meeting data) is processed to determine a speaker. For example, meeting data features are compared to determine a speaker, such as by performing a comparison of meeting data features that comprise information regarding the speaking tempo and identity of speakers listed in an agenda providing information of the meeting. Specifically, a comparison operation can be performed to determine those different speaking patterns, which can indicate an instance of different speakers in a meeting. The user-meeting data, which is utilized by speaker determiner 262, is received, for example, from contextual feature determiner 268, meeting-data collection component 210, or storage 225.

Embodiments of speaker determiner 262 utilize meeting data feature determination logic 230 to determine a speaker's identity used as a meeting data feature. According to one embodiment, speaker determiner 262 processes meeting data 240, user accounts and devices 242, user-meeting data 244, or user configurations/feedback 246 to determine a speaker of a meeting according to the following method. First, one or more speakers/people that were listed in a meeting description (such as an introductory slide of a presentation, an agenda in a pamphlet, or information associated with a corresponding electronic calendar entry) or that were identified during the meeting may be identified. In some embodiments, the speakers are ranked based on the duration of time a corresponding speaker spent speaking or the frequency with which the speaker spoke, or based on a role of the speaker relative to a user, a group of users, or an organization. Further, some embodiments consider communications or interactions having at least a threshold time duration, such as portions of the meeting exceeding two minutes having a common speaker. In one embodiment, the speaker determined by the speaker determiner 262 is communicated to the sensitivity analyzer 280 that determines whether the speaker's content should be classified as having sensitive content. In another embodiment, the speaker determined by the speaker determiner 262 is communicated to the sensitivity mitigation engine 290 that determines a sensitivity mitigation action for the content delivered by the speaker, and meeting presentation modifier 292 generates a modified meeting presentation based on the embodiments discussed herein.

Topic/keyword determiner 263, in general, is responsible for determining specialized information of the meeting, such as topics covered during a corresponding segment of the meeting or keywords provided during the meeting presentation. Embodiments of topic/keyword determiner 263 determine explicit usage of keywords or inferred topics covered by a speaker and are used to determine whether the topic or keyword is associated with sensitive content, used to determine the sensitivity mitigation action, used to generate the modified meeting presentation; and/or used to generate the GUI(s), for example, of FIGS. 3, 4, and 5 (by the meeting presentation modifier 292). For instance, a user (or an administrator) creates a list of topics or specifies content keywords that are associated with sensitive content. Alternatively or in addition, the keywords or topics are automatically generated by the topic/keyword determiner 263, for example, based on at least one of: meeting data 240, user accounts and devices 242, user-meeting data 244, or user configurations/feedback 246. Some embodiments employ user-meeting data to determine content from which topic/keyword determiner 263 can infer topics and/or keywords that are used to determine a segment (by the segment determiner 270), used to determine sensitive content (by the sensitivity analyzer 280), used to determine the sensitivity mitigation action (by the sensitivity mitigation engine 290); and/or used to generate the modified meeting presentation (by the meeting presentation modifier 292). Alternatively, once the segment is determined, according to an embodiment, topic/keyword determiner 263 performs a topic analysis operation (or topic detection, topic modeling, or topic extraction) to determine one or more topics from the segment. In some embodiments, the frequency or recency of topic(s) determined by the topic analysis is determined such that those topics occurring frequently or recently are determined to be meeting data features.

In some embodiments, a computer application or service for identifying topics associated with particular people is used to determine topics associated with target personnel, such as speakers, viewers, audience members, meeting attendees, and the like. In one embodiment, from the topics determined to be associated with speakers, those topics occurring most often are determined as meeting data features. One such example of a computer application or service for identifying topics associated with particular people is Microsoft Viva™ Topics. Some embodiments of topic/keyword determiner 263 can determine topics or keywords that are relevant based on meeting data feature determination logic 230 and/or based on meeting data 240, user accounts and devices 242, user-meeting data 244, or user configurations/feedback 246, as described herein.

In some embodiments, the topic/keyword determiner 263 is responsible for determining questions being asked during the meeting, either by the speaker or an attendee or other person from the audience. Examples of questions determined by topic/keyword determiner 263 comprise, without limitation, at least one of: a portion of a speaker's presentation in which the speaker's speaking tempo changed; certain words being identified, such as words like "question," "who," "what," "where," "when," and the like, as well as the phrases following these words; and the like. Embodiments of topic/keyword determiner 263 determine an inquiry from a chat or other communication other than the speaker. For example, the topic/keyword determiner 263 analyzes a chat or corresponding transcript to determine times in the meeting during which an audience or speaker asked a question. In another example, the topic/keyword determiner 263 may access video frames, employ optical character recognition (OCR) to determine alphanumeric characters in the frame, and extract a topic or keywords from the frame, and associate the extracted topic or keywords to the frame and/or timestamp. In this manner, the sensitivity analyzer 280 can analyze the questions asked and determine if the questions asked are associated with sensitive content.

In some embodiments, the topic/keyword determiner 263 associates the question asked with when the question was answered. For example, when a meeting attendee asked a question in a chat at minute 25, and the speaker answered the question at minute 35 (for example, after reading the chat), the topic/keyword determiner 263 associates the question (from minute 25) to the later associated answer (from minute 35). In one example, the topic/keyword determiner 263 associates a question and an answer based on a comparison of the topic associated with the question and a topic associated with candidate answers. Thereafter, the sensitivity analyzer may automatically associate the answer as containing sensitivity content if the sensitivity analyzer 280 determines that the question includes sensitivity content. In this manner, computational resource utilization can be reduced since the sensitivity analyzer 280 can determine a topic of only the question (or answer), and leverage the association between the question and the answer to remove the answer (or the question).

In some embodiments, the topic/keyword determiner 263 determines user-meeting data that comprises a person or entity being mentioned during the meeting. In one embodiment, the user-meeting data is used to determine a meeting data feature indicating that a particular person or entity was mentioned during the meeting either through an uttered word or visual content, such as text indicative of a name included on a slide of a presentation. For example, the mention of the person or entity includes, without limitation, instances during the meeting when a speaker uttered the name or identity of the person or entity, such as when the speaker uttered the name of the user or any person determined to be of interest to the users, such as the enterprise CEO. Alternatively, in one example, the mentions include visual content (determined by the visual feature determiner 264) or audio content (determined by the audio feature determiner 266) corresponding to text (in a presentation) indicative of the name or identity of a person or entity. For example, mentions include a mention of a person or entity by someone other than the speaker via any suitable type of communication or media format, such as live in-meeting chats, post-meeting question-and-answer sessions, visual text, visual content (for example, identified using object detection methodologies), or pre-meeting chat sessions. The user-meeting data is received, for example, from contextual feature determiner 268, meeting-data collection component 210, or from storage 225.

In some embodiments, a meeting data feature including a mention of a person or entity is processed to determine relevance to the meeting content or the organization. In particular, determining irrelevance can indicate a likelihood that the mention comprises sensitive (unwanted) content. For example, meeting data feature determination logic 230 is used to determine relevance of a meeting data feature to a particular user, a group of users, or an enterprise. In one example, relevance is determined based on any number of criteria such as, without limitation, the number of times any name or entity was mentioned during the meeting (for example, as determined by processing a transcript of the meeting); or from associations of the name or entity mentioned with contextual data regarding the meeting such as enterprise data, meeting invite attachments or communication regarding the meeting.

In one embodiment, the topic/keyword determiner 263 employs any suitable rules (which include static or predefined rules defined by the meeting data feature determination logic 230), Boolean logic, decision trees (for example, random forest, gradient boosted trees, or similar decision algorithms), conditions or other logic, a deterministic or probabilistic classifier, fuzzy logic, neural network, finite state machine, support vector machine, logistic regression, clustering, machine-learning techniques, similar statistical processes, or combinations of these.

Visual feature determiner 264, in general, is responsible for determining one or more visual objects in the meeting presentation. In one embodiment, the visual feature determiner 264 determines visual objects based on media formats of the meeting presentation. For example, the visual feature determiner 264 determines whether the meeting presentation includes visual content (such as presentation slide(s), document, people, visual indications of text, props, visual transitions, and other content). In one example, the visual feature determiner 264 classifies content distributed to an audience of viewers. In some embodiments, the visual feature determiner 264 determines authorized personnel within the audience or who have received or viewed the content. In one example, based on the level of authorization of the personnel, the sensitivity analyzer 280 determines whether to apply a sensitivity mitigation action to block the visual content. In this example, the sensitivity mitigation engine 290 may remove (for example obscure) certain text in the visual content or remove certain images from the visual content, for example, based on an authorization level of a recipient of the content.

In some embodiments, the visual feature determiner 264 determines visual features that can be conveniently described by a feature vector, such as an nth dimensional vector of numerical features that represent some phenomena, where n is any positive integer, such as 1, 2, 3, and so forth. The video features may be used to train any suitable object-detection machine learning (ML) employed via meeting data feature determination logic 230 or sensitivity logic 235. In the context of training an ML model, the visual features may correspond to "edges" and "objects." In one example, an "edge" in an image may refer to an image contour across which the brightness or hue of the image changes, for example, in the magnitude or in the rate of change in the magnitude. The edge may be detected using histograms or Gaussian convolution numerical methods. The edges in an object may include the surface-normal discontinuity (top vs. side), depth discontinuities (for example, side of an object), surface-reflectance or reflective discontinuities (for example, text or ink), or illumination discontinuities (for example, shadows), to name a few. In one example, an "object" in an image may refer to an entity identified as separate from another entity or background, for example, based on edges separating the entities from each other or from a background. For example, an object may be detected based on a gradient threshold that is exceeded for gradients between neighboring pixels. Example ML models include a deep learning model, a neural network model, a logistic regression model, a support vector machine model, and the like. In one example, visual feature determiner 264 may employ an ML model using a You Only Look Once (YOLO) methodology, Region-based Convolutional Neural Network (R-CNN) methodology, Single Shot Detector (SSD) methodology, and the like.

Moreover, the visual feature determiner 264 may include an ML model trained using supervised learning whereby training data, such as labeled data and/or unlabeled data, is provided to the object-detection ML model as discussed herein. For example, the labeled data includes a positive or negative label for a corresponding edge or object. For example, labeled data for a human object, alphanumeric characters, background objects, hand gestures, body parts, and the like, is provided to the visual feature determiner 264 to train the ML model. However, it should be understood that the ML model can also be trained via suitable techniques other than supervised learning, including unsupervised or reinforcement learning. In one embodiment, the ML model trained and employed by the visual feature determiner 264 may be trained and employed by the meeting data feature determination logic 230. The meeting data feature determination logic 230 may define logic for using the object-detection to detect, track, and classify any suitable visual aspects of the meeting presentation. The audio feature determiner 266 may similarly train and employ an ML model to determine and classify audio in the meeting presentation. In one embodiment, the visual feature determined by the visual feature determiner 264 is communicated to the sensitivity analyzer 280 that determines whether the visual feature should be classified as having sensitive content. In another embodiment, the visual feature determined by the visual feature determiner 264 is communicated to the sensitivity mitigation engine 290 that determines a sensitivity mitigation action for the visual feature, and the meeting presentation modifier 292 generates a modified meeting presentation based on the embodiments discussed herein.

Audio feature determiner 266, in general, is responsible for determining and/or classifying audio in the meeting presentation. In one embodiment, the audio feature determiner 266 determines audio objects based on media formats of the meeting presentation. In one embodiment, the determination is based on meeting data feature determination logic 230. In one example, the audio feature determiner 266 determines that the meeting presentation includes audio content indicative of a speech or other sound-delivered communication and then employs a natural language processing (NLP) methodology to determine text parameters. Text parameters, for example, include a count of words; punctuation marks, such as commas, periods, exclamation points, colons, and other grammar marks extracted by the audio feature determiner 266 from a transcript of audio or a raw audio file; vowels; consonants; spaces; and so forth. In one embodiment, the audio feature determiner 266 determines metadata about a format in which a segment is presented. For example, the audio feature determiner 266 determines background music, audio from a speaker delivering audio content, and/or any other suitable metadata. Other example metadata includes information about the author, the message type, post date and time, versions, links (un-shortened), location, and comments.

In one embodiment, the audio feature determined by the audio feature determiner 266 is communicated to the sensitivity analyzer 280 that determines whether the audio feature should be classified as having sensitive content. In another embodiment, the audio feature determined by the audio feature determiner 266 is communicated to the sensitivity mitigation engine 290 that determines a sensitivity mitigation action for the audio feature, and meeting presentation modifier 292 generates a modified meeting presentation based on the embodiments discussed herein.

Contextual feature determiner 268 is generally responsible for determining contextual information associated with the meeting, the meeting presentation, and the relationship of the user to the meeting presentation. In one example, contextual information refers to features that are contextual, which correspond to features that are not explicitly in the meeting. Embodiments of contextual feature determiner 268 determine user-meeting data 244 associated with a particular user, which includes user-related activity data and/or context data, and/or provides the determined user-meeting data 244 as structured data, such as one or more meeting data features, so that it may be used by other components of system 200. In one example, the contextual feature determiner 268 determines contextualized segments of the meeting presentation, contextualized segment representations for the segments, and/or a contextualized meeting structure for a particular user, based on user-meeting data 244.

In some embodiments, contextual feature determiner 268 determines current or near-real-time user activity information and also determines historical user activity information, which is determined based on gathering observations of user activity over time, accessing user logs of past activity (such as communication history, a user activity during a meeting, and the like, for example). Accordingly, contextual feature determiner 268 can determine current and historic user activity information that may be used by other components of system 200 to determine, for example, that: a meeting is taking place; a meeting has occurred; a user is listed as an invitee for a meeting; a user is listed as an attendee for the meeting; a role of a user within an organization; a purpose of a meeting; a description of a meeting; a time and date during which the meeting is taking or took place; conferences or meetings in which the user spoke; topics that are sensitive in view of the meeting attendees and presenter(s); and an indication that the particular user and the other users have attended meetings together, have similar interests or similar characteristics, have worked in the same office or location, or that the particular user and the other user share a connection with a third user.

In some embodiments, the user-meeting data 244 determined by contextual feature determiner 268 (or its subcomponents) includes user-related activity information from one or multiple user devices associated with a user and/or from cloud-based services associated with a user (such as email, meeting information sources, calendars, social media, or similar information sources), and/or includes contextual information associated with the user activity or user-meeting data. For example, information about user activity on a particular device or cloud-based service is used to determine a context associated with the user, which is used for determining a segment of the meeting presentation, sensitive content, a sensitivity mitigation action, and/or a modified meeting presentation. In an embodiment, contextual feature determiner 268 includes one or more computing applications or services that analyze information detected via one or more user devices used by a user and/or cloud-based services associated with the user to determine activity information and/or contextual information. Information about user devices associated with a user may be determined from the user-meeting data made available via meeting-data collection component 210, and may be provided to contextual feature determiner 268 or other components of system 200.

More specifically, in some implementations of contextual feature determiner 268, a user device is identified by detecting and analyzing characteristics of the user device, such as device hardware, software (such as operating system (OS)), network-related characteristics, user accounts accessed via the device, and similar characteristics. For example, information about a user device is determined by using functionality of many operating systems to provide information about the hardware, OS version, network connection information, installed application, or the like. The GUI that a user device may present may be based on the type of user device. For example, a mobile device presents fewer selectable features for controlling application of a sensitivity mitigation action as compared a laptop device, at least because there is more screen size on the laptop device.

Some embodiments of contextual feature determiner 268 determine a device name or identification (device ID) for each device associated with a user. This information about the identified user device(s) associated with a user may be stored as user accounts and devices 242 in storage 225. In an embodiment, a user device is polled, interrogated, or otherwise analyzed to determine information about the device. This information may be used for determining a label or identification of the device (for example, a device ID) so that user interaction with the device may be recognized from user-meeting data 244 by contextual feature determiner 268. In some embodiments, users declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account (MSA), email account, social network, or the like, are identified and determined to be associated with the user.

In some embodiments, contextual feature determiner 268 determines interpretive data based on received user-meeting data 244, such as described previously. It is contemplated that embodiments of contextual feature determiner 268 can use the user-meeting data 244 and/or interpretive data for carrying out the objectives of the subcomponents described herein. Additionally, although several examples of how contextual feature determiner 268 identifies user-related activity information are described herein, many variations of user activity identification and user activity monitoring are possible in various embodiments of the disclosure.

Alternatively, or in addition, in some embodiments, the contextual feature determiner 268 determines and extracts context. Similarly, in some embodiments, the contextual feature determiner 268 extracts information about a user and/or a meeting, such as meeting data features, based on an identification of the user activity. Examples of extracted user-related activity information include user location, app usage, online activity, searches, communications (such as chat, call, or message information), types of meetings attended (including the duration of meeting, topics of the meeting, and speakers of the meeting), usage duration, application data (for example, emails, meeting invites, messages, posts, user status, notifications, and so forth), or nearly any other data related to user interactions with the user device or user activity via a user device. For example, a user's location is determined using GPS, indoor positioning (IPS), or similar communication functionalities of a user device associated with a user. Data determined by the contextual feature determiner 268 can be provided to other components of system 200, or can be stored as user-meeting data 244 in storage 225. In some embodiments, the contextual feature determiner 268 performs conflation on detected user-meeting data. For example, overlapping information is merged and duplicated, or redundant information is eliminated.

In some embodiments, the meeting data features are interpreted to determine that particular user activity has occurred. For example, the contextual feature determiner 268 employs user-activity event logic, which includes rules, conditions, associations, classification models, or other criteria to identify user activity. In one embodiment, user-activity event logic includes comparing user activity criteria with the user-meeting data in order to determine that an activity event associated with a user action taken during a meeting presentation has occurred. Similarly, activity event logic may specify types of detected user-device interaction(s) that are associated with an activity event, such as a user's (for example presenter's) computer inputs during the meetings, a user's vision or focus on a particular portion of a screen, a user input, and so forth. In some embodiments, a series or sequence of user device interactions is mapped to an activity event, such that the activity event is detected upon determining that the user-meeting data indicates that the series or sequence of user interactions has been carried out by the user.

In some embodiments, the contextual feature determiner 268 determines a context associated with user-related activity or user-meeting data. As further described herein, a context (or context logic) may be used to determine a segment of the meeting presentation, sensitive content contained in the meeting presentation, a sensitivity mitigation action to at least partially remove the sensitive content, and the like, to facilitate generating or formatting a modified meeting presentation that at least partially removes the sensitive content based on application of the sensitivity mitigation action.

Some embodiments of contextual feature determiner 268 determine context related to a user action or activity event, such as people entities identified in a user activity or related to the activity (for example, recipients of content being shared by the user, which is sent to an alias corresponding to the audience or meeting attendees), which includes nicknames used by the user (for example, "boss" and "classmate," referring to specific entities identified in the user's contacts by their actual names, or group names such as "project team" or "executive team," which refer to specific groups of people identifiable from user-meeting data), and utilize a named-entity extraction model or named-entity recognition model.

In some embodiments, contextual feature determiner 268 determines or extracts one or more user features (or variables) characterizing the user or the user's information relative to a meeting, and/or for determining structured user-meeting data associated with a user or meeting. User features may be determined from information about user-meeting data received from meeting-data collection component 210, which may include context data. In some embodiments, contextual feature determiner 268 receives information from one or more of these other components of system 200 and processes the received information to determine one or more user features or meeting data features that are specific to a user. For example, user-meeting data processed by the contextual feature determiner 268 comprises unstructured, semi-structured, or structured data about a user (or other users). In some embodiments, this received user-meeting data is converted into a structured data schema or record, a feature vector, one or more data feature-value pairs, or other data record that is usable for determining a segment, a segment representation for the segment, or a meeting structure.

Examples of meeting-related features determined or extracted by contextual feature determiner 268 include, without limitation: data from information sources associated with the user, such as an organizational chart or employment data (for example, who a user reports to, works with, manages (or who reports to a user)); a user's role; information about project team(s), which can include project-team members, or similar information; social media or social collaboration information sources (for example, the user's LinkedIn® connections or GitHub® contributions or collaborations); location-related features; venue-related information associated with the location or other location-related information; other users present at a venue or location; time-related features; current-user-related features, which include information about the current or recent user of the user-device; user device-related features, such as device type (for example, desktop, tablet, mobile phone, fitness tracker, heart rate monitor, or other types of devices), hardware properties or profiles, OS or firmware properties, device IDs or model numbers, network-related information, position/motion/orientation-related information about the user device, network usage information, app usage on the device, user account(s) accessed or otherwise used (such as device account(s), OS level account(s), or online/cloud-service related account(s) activity, such as Microsoft® MSA account, online storage account(s), email, calendar, meetings, or social networking accounts); a purpose of a meeting; content-related features, such as meeting topics, presentations, a text transcript of the meeting (that is correlated to a timing or duration of the meeting, a speaker of the meeting, or topic), or attendees; user activity, such as verbal commands, searches, browsed websites, purchases, social networking activity, communications sent or received including social media posts; an enterprise, state-wide, or federal sensitivity policy, or any other features that are detected or sensed and used for determining data associated with or characterizing a user or meeting. Any other user-specific features are also alternatively or additionally possible.

Some embodiments of contextual feature determiner 268 can determine interpretive or semantic data from meeting data 240, user accounts and devices 242, user-meeting data 244, or user configurations/feedback 246, which is used to determine user features or other structured user data. For example, while a user-activity feature indicates a URL visited by the user, a semantic analysis determines information about the URL, such as the level of sensitivity associated with the URL, or other data associated with detected user activity or user data. Thus, in one embodiment, semantic analysis determines additional user-activity related features or user data that is semantically related to other data and which may be used for further characterizing the user or for determining a context. In some embodiments, a context determined by contextual feature determiner 268 is provided to other components of system 200 or stored as user-meeting data 244 in storage 225, where it is accessed by other components of system 200.

User-input feature determiner 269, in general, is responsible for determining user feedback regarding previously determined sensitive content and corresponding sensitivity mitigation actions. In some embodiments, the user-input feature determiner 269 may receive an indication related to a user input to a GUI (such as the GUIs illustrated in FIGS. 3, 4, and 5) for providing feedback regarding identified sensitive content and a suggested sensitivity mitigation action for rectifying the sensitive content.

In one example, the user-input feature determiner 269 may receive an indication regarding the user's approval to apply the sensitivity mitigation action to a flagged candidate segment of the meeting recording automatically identified as potentially having sensitivity content. A user may submit such input via any suitable sensitivity control GUI element 306 or action customization region 520, such as those illustrated in the GUIs 302, 402, or 502 of FIGS. 3, 4, and 5, respectively. In one embodiment, the user-input feature determiner 269 stores the user inputs as user configurations/feedback 246. In one embodiment, the user-input feature determiner 269 communicates the user's approval of the sensitivity mitigation action to the meeting presentation modifier 292. In response to receiving the user's approval, the meeting presentation modifier 292 may apply the sensitivity mitigation action determined by the sensitivity mitigation engine 290 to the flagged candidate segment to at least partially remove the sensitivity content. Alternatively, in response to receiving the user's approval, the meeting presentation modifier 292 may maintain application of the sensitivity mitigation action when the sensitivity mitigation action has already been applied. In one embodiment, the indication of the user's approval may serve as a positive label used to refine any aspect of the system 200. For example, the positive label is received by the sensitivity analyzer 280 to refine determination of the sensitive content, received by the sensitivity mitigation engine 290 to refine determination of the sensitivity mitigation action, received by the meeting presentation modifier 292 to refine modification of the meeting presentation. In some embodiments, the positive label is saved as user configurations/feedback 246 in storage 225 and used by system 200 to update aspects of the meeting data feature determination logic 230.

In one example, the user-input feature determiner 269 may receive an indication regarding the user's denial (also referred to herein as "rejection," in at least one example) to apply the sensitivity mitigation action to a flagged candidate segment of the meeting presentation automatically identified as potentially having sensitivity content. A user may submit such input via any of suitable GUI, such as the sensitivity control GUI element 306 illustrated in FIGS. 3 and 4. In one embodiment, the user-input feature determiner 269 communicates the user's denial of the sensitivity mitigation action to the meeting presentation modifier 292. In response to receiving the user's denial, the meeting presentation modifier 292 may avoid applying the sensitivity mitigation action determined by the sensitivity mitigation engine 290 to the flagged candidate segment, thereby leaving the flagged candidate segment unchanged between the meeting presentation and the modified meeting presentation. Alternatively, in response to receiving the user's denial, the meeting presentation modifier 292 may revert the portion of the meeting presentation to which the sensitivity mitigation action was previously applied so that the sensitivity mitigation action is not applied. In one embodiment, the indication of the user's denial may serve as a negative label used to refine any aspect of the system 200. For example, the negative label is received by the sensitivity analyzer 280 to refine determination of the sensitive content, received by the sensitivity mitigation engine 290 to refine determination of the sensitivity mitigation action, and/or received by the meeting presentation modifier 292 to refine modification of the meeting presentation. In some embodiments, the negative label is saved as user configurations/feedback 246 in storage 225 and used by system 200 to update aspects of the meeting data feature determination logic 230.

Continuing with example system 200 of FIG. 2, segment determiner 270 is generally responsible for determining continuous portions of the meeting presentation that share common characteristics, based on the meeting data features. In particular, embodiments of segment determiner 270 determine at least one segment having a duration defined between a start and end time. In one example, the segment determiner 270 determines the segment based on the meeting data features (determined by the meeting data feature determiner 260). In some embodiments, data associated with the meeting data features is received from meeting data feature determiner 260 (or its subcomponents) or from meeting data 240 or any other data structure stored in storage 225.

In one embodiment, the segment determiner 270 determines the segment as part of a post-processing process of storing the meeting. After the meeting ends, the meeting is stored, for example, in storage 225. The segment determiner 270 may access the meeting to begin post-processing. Alternatively, in some embodiments, the post-processing process is initiated or performed by any other component of FIG. 2, such as, but not limited to, the meeting-data collection component 210, the meeting data feature determiner 260, and so forth.

In some embodiments, user-meeting data associated with a particular user, which indicates that user's context and/or intent when interacting with a meeting presentation, is used by segment determiner 270 to determine the segment for the user. Thus, segment determiner 270 also may receive the meeting data 240, user accounts and devices 242, user-meeting data 244, or user configurations/feedback 246. Further, in some embodiments of segment determiner 270, the sensitive content, the sensitivity mitigation action, and/or the modified meeting presentation are determined based on the meeting data 240, user accounts and devices 242, user-meeting data 244, or user configurations/feedback 246, such as described herein.

In one example, the segment determiner 270 determines a segment by determining a contiguous portion of the meeting presentation having a common meeting data feature, which includes at least one of an indication of: a gap of the meeting presentation, an identity of a speaker in the meeting presentation, a relationship of the speaker to a viewer, a topic of the meeting presentation, a type of meeting presentation, a visual feature, an audio feature, a contextual feature, a user-input feature, a duration of the meeting presentation, a duration of pauses in the meeting presentation, a transition from a first speaker to a second speaker different from the first speaker, a meeting type, a media type, or contextual metadata expressed as data features indicative of meeting invitees, meeting attendees, or a type of meeting. In one example, the segment determiner 270 determines the segment by further determining a start time of the contiguous portion of the meeting presentation that corresponds to a first change of the common meeting data feature; determining an end time of the contiguous portion of the meeting presentation that corresponds to a second change of the common meeting data feature; and determining the segment of the meeting presentation as the contiguous portion of the meeting presentation from the start time to the end time.

In some embodiments, the segment determiner 270 determines a segment based on the meeting data feature determiner 260 (or its subcomponents). For example, the segment determiner 270 receives an indication of a gap from the gap determiner 261, such that the segment corresponds to the portion (defined between a start and end time) of the meeting presentation sharing characteristics with the gap determined by the gap determiner 261. In some embodiments, whether characteristics are shared is based on an analysis of the portions of the meeting presentation surrounding the identified gap, and/or is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a segment includes the portion of the meeting presentation that does not include audio features, visual features, and the like.

As another example, the segment determiner 270 receives an indication of a speaker from the speaker determiner 262, such that the segment corresponds to the portion of the meeting during which the determined speaker speaks or delivers content. The segment during which the speaker speaks or delivers may have a duration defined between a start time (during which the speaker begins speaking) and an end time (at which the speaker stops speaking or speaks a transition word, such as "thank you," "I now pass the presentation to," and so forth). In some embodiments, the segment determiner 270 determines the segment based on a portion of audio sharing sound parameters with the voice of the speaker determined by the speaker determiner 262 or based on a portion of a video frame sharing visual parameters with an identity (for example, contour or facial ratios) of the speaker. In one embodiment, the sound parameters are determined by the audio feature determiner 266, and the visual parameters are determined by the visual feature determiner 264. In some embodiments, whether the sound parameters are shared with a voice of the speaker or whether the visual parameters are associated with the speaker is based on an analysis of the portions of the meeting presentation surrounding the identified sound parameter, the identified visual parameter, and/or is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a segment includes the portion of the meeting presentation during which a speaker speaks or delivers content.

As another example, the segment determiner 270 receives an indication of a keyword or topic from the topic/keyword determiner 263, such that the segment corresponds to the portion (defined between a start and end time) of the meeting presentation sharing characteristics with the keyword, topic, or question determined by the topic/keyword determiner 263. In some embodiments, whether characteristics are shared is based on an analysis of the portions of the meeting presentation surrounding the identified keyword or the portions covering the determined topic. In some embodiments, whether characteristics are shared is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. In one embodiment, a segment includes the portion of the meeting presentation covering a topic (for example, engineering updates within the enterprise; or portions covering legal updates within the enterprise). In this manner, the segments determined for one user (for example, the engineer) may differ from the segments determined for another user (for example, the lawyer) based on the topics that are of interest to a user based on the respective user-meeting data.

As another example, the segment determiner 270 receives an indication of a media format from the visual feature determiner 264 and/or the audio feature determiner 266, such that the segment corresponds to the portion (defined between a start and end time) of the meeting presentation sharing features (for example, visual features or audio features). In one embodiment, the segment determined by the segment determiner 270 includes a segment defined between when a particular presentation slide was presented to when the particular presentation slide was changed, as indicated by the visual feature determiner 264 and/or the audio feature determiner 266. In some embodiments, whether characteristics are shared is based on an analysis of the portions of the meeting presentation surrounding the identified media format, and is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a segment includes the portion of the meeting presentation sharing visual or audio aspects of the media format, such as a slide, a speaker's face talking, and so forth.

Continuing with FIG. 2, the sensitivity analyzer 280 is generally responsible for determining sensitive content contained in the meeting presentation. In some embodiments, the sensitivity analyzer 280 determines whether an aspect of a meeting presentation (or a segment of the meeting presentation that includes the aspect) includes sensitive content or is likely to include sensitive content. Some embodiments of sensitivity analyzer 280 determine a likelihood (such as a sensitivity score) that an aspect (or segment) includes sensitive content. In particular, some embodiments of sensitivity analyzer 280 analyze a particular aspect or segment according to various processes described herein, such as relatedness to other aspects or segment, semantic analyses, or classification according to rules, logic (such as sensitivity logic 235), or using a machine learning model. In an embodiment, each analytical process that is applied to an aspect or segment produces a component sensitivity likelihood or component sensitivity score that is combined with other analytical processes to result in a composite sensitivity likelihood or composite sensitivity score for the aspect or segment. In some instances, particular component likelihoods or scores may be weighted based on the particular analytical process employed for determining the component likelihood or score, and or the meeting data or user data associated with the aspect of segment. Alternatively or in addition, a sensitivity scope may comprise set or a vector of component sensitivity scores, each determined from an analytical process by sensitivity analyzer 280. Alternatively or in addition, any one component score (or a sensitivity likelihood determined by any one of an analytical process employed by sensitivity analyzer 280) may be utilized to determine that the aspect or segment contains sensitive content. For instance, if the sensitivity likelihood determined according to a particular analytical process satisfies a threshold, (for example, if the likelihood exceeds fifty percent or more likely than not), then the aspect or the segment may be determined to comprise sensitive content.

In one embodiment, the sensitivity analyzer 280 determines whether the meeting presentation includes sensitive content based on the meeting data 240, the user accounts and devices 242, the user-meeting data 244, and/or the user configurations/feedback 246. In one example, the sensitivity analyzer 280 determines sensitive content without reference to a segment. For example, the sensitivity analyzer 280 classifies certain aspects of the meeting presentation content such as trigger words, phrases, pitches, or other sounds parameters determined by the audio feature determiner 266 as containing sensitive content. Alternatively or additionally, the sensitivity analyzer 280 can classify certain aspects of the meeting presentation content determined by the visual feature determiner 264 as containing sensitive content. For example, these visual aspects may comprise extracted text (such as text extracted via object character recognition from images of documents, browser windows, application windows, background images), images of people (such as faces or bodies), or other visual content. In some embodiments, the sensitivity analyzer 280 determines sensitive content based on the meeting data features determined by the meeting data feature determiner 260.

Some embodiments of sensitivity analyzer 280 utilize sensitivity logic 235 to determine sensitive content or a likelihood of sensitive content in an aspect (or segment) of a meeting presentation. Sensitivity logic 235 comprises computer instructions including rules, conditions, associations, predictive models, classification models, and/or other criteria for, among other operations, determining that a particular aspect of a meeting presentation comprises sensitivity content, or for determining a likelihood that an aspect, segment, or a meeting data feature comprises sensitive content. In some embodiments, sensitivity logic 235 comprises or corresponds to a sensitivity policy for an organization, government, or a region. Sensitivity logic 235 may take different forms, depending on the particular aspect and/or data feature for which sensitivity logic 235 is applied to. For example, sensitivity logic 235 comprises any suitable rules, such as Boolean logic, various decision trees (for example, random forest, gradient boosted trees, or similar decision algorithms), conditions or other logic, fuzzy logic, neural network, finite state machine, support vector machine, machine-learning techniques or models, or combinations of these to determine (or facilitate determining) the occurrence or likely occurrence of sensitive content according to embodiments described herein. In one embodiment, sensitivity logic 235 comprises a machine learning (ML) model for classifying an aspect, meeting feature, or segment as comprising sensitive content. In some implementations, the ML model is trained using labeled data that is determined based on instances of sensitive content previously identified by other users. For example, as discussed herein in connection with action customization region 520 of FIG. 5, a user's actions, in regards to the application of a sensitivity mitigation action on a flagged candidate segment of a meeting, may be used to generate labeled training data for an ML model to more accurately detect content that is sensitive.

In some embodiments, sensitivity analyzer 280 determines sensitive content based on a policy, which may be specified or encoded as at least a portion of sensitivity logic 235. Example policies include a regional policy, a national policy, a state policy, an enterprise policy, or any other set of rules or criteria defining goals and associated tolerances for content deemed acceptable or unacceptable. For example, a regional policy may include a list of acceptable or unacceptable phrases or topics corresponding to societal norms. In this manner, the sensitivity analyzer 280 can determine sensitive content that is specific to a global region, an enterprise, or any suitable group or individual. For example, in some embodiments, sensitivity analyzer 280 determines that content is sensitive to certain users based on an authorization level associated with the user. In particular, often within an organization, certain users will have authorization or permission to access certain information that should not be accessible to all users within the organization. For instance, a human resources employee may have access to information about employees that is not accessible to other employees. Accordingly, in some embodiments, content sensitivity determined by sensitivity analyzer 280 is with respect to an end user to whom the content is revealed.

In some embodiments, the sensitivity analyzer 280 classifies or ranks an aspect of a segment (which may be determined by segment determiner 270) into any number of subgroups based on the meeting data 240, the user accounts and devices 242, the user-meeting data 244, and the user configurations/feedback 246. The sensitivity analyzer 280 may employ any suitable ranking or classification scheme to rank or classify the aspects or segments. For example, the ranking or classification scheme may include a three-tier system for classifying or ranking sensitive content. In this example, the sensitive content may include high sensitivity content, medium sensitivity content, and low sensitivity content. In another example, the sensitivity analyzer 280 ranks or classifies the sensitive content based on the type of sensitive content, such as high sensitivity audio content, medium sensitivity audio content, and low sensitivity audio content and/or high sensitivity visual content, medium sensitivity visual content, and low sensitivity visual content. In these examples, the high sensitivity content may be ranked higher than the medium sensitivity content and the low sensitivity content, so that the high sensitivity content may be better or more precisely addressed (for example, removed) by the sensitivity mitigation engine 290. Although the sensitivity analyzer 280 is discussed in the context of classifying and ranking the segments, it should be noted that the sensitivity analyzer 280 may classify or rank any aspects of content or portions of the meeting presentation.

In some embodiments, the sensitivity analyzer 280 stores an indication of the identified sensitive content in storage 225. For example, the sensitivity analyzer 280 stores the classified or ranked segments as meeting data 240 or user-meeting data 244. In this manner, the components of system 200, such as the sensitivity mitigation engine 290, can access the indications of sensitive content. In one embodiment, the segment identified as having sensitive content is classified as a flagged candidate segment. As discussed herein, the sensitivity mitigation action can be applied to the flagged candidate segment to generate a sensitivity-compliant segment.

In one embodiment, a semantic analysis is performed on at least a portion of the meeting data 240, user accounts and devices 242, user-meeting data 244, or user configurations/feedback 246 to characterize aspects of the meeting presentation. For example, the user-related activity features are classified or categorized (such as by type, time frame or location, work-related, home-related, themes, related entities, other user(s) (such as communication to or from another user) and/or relation of the other user to the user (for example, family member, close friend, work acquaintance, boss, or the like, or other categories), or related features are identified for use in determining a similarity or relational proximity to other user-related activity events. In some embodiments, a semantic analysis utilizes a semantic knowledge representation, such as a relational knowledge graph. A semantic analysis may also utilize semantic analysis logic, including rules, conditions, or associations to determine semantic information related to a user activity occurring during the meeting. A semantic analysis may also be used to further determine or characterize a context, such as determining that a topic of a meeting has been identified by an administrator (for example, the user's boss) as sensitive content. For example, the enterprise may have a policy against watching certain content or engaging with certain websites (such as personal email, gambling, and so forth).

In one embodiment, the sensitivity analyzer 280 determines a level of sensitivity (for example, a sensitivity likelihood or score) based on a duration of a segment. In one example, a short segment has a higher probability of containing sensitive content because a presenter may quickly change display of their screen to minimize sensitive content exposure. As such, in one embodiment, the sensitivity analyzer 280 analyzes segments (determined by segment determiner 270) for sensitivity content based on their duration or length. For example, shorter segments are analyzed for sensitive content before longer segments.

In one embodiment, the sensitivity analyzer 280 determines a likelihood that a segment contains sensitive content based on a degree of similarity (or dissimilarity) between or among aspects (or segments) of presentation content and/or meeting data features associated with the aspects (or segments). Some embodiments further utilize a criteria defining sensitive content (for example, as defined by a policy). For instance, a degree of similarity first may be determined automatically and used to indicate a possibility of sensitivity content associated with an aspect or segment. Then the aspect or segment may be further analyzed by sensitivity analyzer 280 according to a sensitivity polity and/or using a machine learning model that is trained on instances of sensitive content previously identified by other users. Based on this further analysis, the particular aspect or segment is determined to comprise (or not comprise) sensitive content. Alternatively or in addition, the aspect of segment is flagged for presentation to the user with an indication that the aspect or segment may contain sensitive content.

In one embodiment, the degree of similarity comprises a similarity (or dissimilarity) measure. For example, the similarity measure is determined using a similarity function, distance measurement, clustering, correlation, dissimilarity matrix, statistical relatedness, or other suitable measure of relatedness. For instance, one embodiment uses a semantic similarity. In one embodiment, the degree of similarity is expressed as a percentage, ratio, threshold value, or any combination thereof. In one embodiment, the degree of similarity is expressed as a threshold percentage of total meeting data features, such that a higher percentage (for example, higher than a first threshold) of similarity between the segment and the policy defining sensitive content corresponds to the highest possible likelihood that the segment contains sensitive content. The higher percentage may be any suitable percentage, such as 30%, 40%, 50%, 60%, 70%, 80%, 90%, or any percentage value in between, lower, or higher. As a result, the sensitivity analyzer 280 determines the segment to have sensitive content and determines that the sensitivity mitigation action should be applied.

In another example, suppose the percentage of similarity is lower than the higher percentage of similarity (for example, lower than the first threshold, but higher than a second threshold). In response to determining that the percentage of similarity is below the first threshold but higher than a second threshold, certain embodiments of the sensitivity analyzer 280 classify the segment as potentially having sensitive content. In one embodiment, based on the degree of similarity being between the first and second thresholds, the sensitivity analyzer 280 classifies the segment as a flagged candidate segment of which the user is notified about so that the user can choose whether or not to apply (or customize) the sensitivity mitigation action.

In another example, suppose the percentage of similarity is lower than the second threshold. In this example, based on the percentage of similarity being lower than the second threshold, the sensitivity analyzer 280 determines the segment to not have sensitive content. As a result, in this example, the sensitivity analyzer 280 leaves the segment unmodified and does not classify the segment as a flagged candidate segment. Although these examples are discussed in the context of two thresholds, these embodiments are applicable to any number of thresholds or no thresholds. Additionally, although this example is discussed in the context of the sensitivity analyzer 280 determining a degree of similarity, in some embodiments, the sensitivity analyzer 280 automatically determines a segment as having sensitive content in response to detecting any particular phrase, word, or object.

By way of another example, the sensitivity analyzer 280 determines an order of the sensitive content based on a relevance of the sensitive content or the corresponding segment to the user. For example, based on a first meeting data feature associated with a first segment of the meeting presentation, the sensitivity analyzer 280 determines a first relevance weight relative to the user. Continuing this example, the sensitivity analyzer 280 determines, based on a second meeting data feature associated with a second segment of the meeting presentation, a second relevance weight relative to the user. Additionally or alternatively, the sensitivity analyzer 280 determines, based on the first relevance weight being greater than the second relevance weight, a more extensive sensitivity mitigation action (for example, removing the entire first segment and merely muting the second segment). In this manner, the sensitivity analyzer 280 determines a sensitivity mitigation action based on a comparison of weights between segments containing sensitive content. Similarly, in one embodiment, the listing of flagged candidate segments are presented to a user based on a weight of the segments. For example, the meeting presentation modifier 292 or the presentation component 220 presents the flagged candidate segment for user approval or customization based on the weight. In one example, the flagged candidate segment having the highest (or lowest) weight is presented first and the flagged candidate segment having the lowest (or highest) weight is presented last.

In some embodiments, the sensitivity analyzer 280 employs sensitivity logic 235 to determine a weight or a category for a particular segment. In one example, weights or a respective category of the segments are used to determine the sensitivity mitigation action and/or generate the modified meeting presentation. For instance, according to some embodiments, a weight or category corresponds to an order for presenting the flagged candidate segments for user approval or customization by the meeting presentation modifier. In one embodiment, a weight is determined and used for inferring relevance of sensitive content of a segment to the user. For example, a high weight indicates higher relevance; a low weight indicates lower relevance; or conversely, a high weight indicates lower relevancy; or a low weight indicates higher relevancy. Similarly, the sensitive content of the segment may be classified as a particular category or segment, which may indicate relevance to the user. In some embodiments, a weight or a category of a segment is determined based on a classification of a meeting data feature of the segment, which may be determined as described previously using meeting data feature determination logic 230.

In some embodiments, sensitivity analyzer 280 uses user-meeting data associated with a particular user to determine the relevance of the segment to the user, which is represented as the weight or a category associated with the segment. Thereafter, in one embodiment, the sensitivity mitigation action is determined based on the weight or category. For example, each category may correspond to a weight corresponding to a level of relevance to a user based on user settings specified in user configurations/feedback 246. In one implementation, the user inputs to approve or deny application of the sensitivity mitigation action is stored as user configurations/feedback 246, which is used to refine sensitivity logic 235 to improve the sensitivity mitigation action or the order of the segments containing sensitivity mitigation action.

A weight or category for the segment is determined, for example and without limitation: based on meeting data features (determined by meeting data feature determiner 260); based on user history, such as whether the user has previously approved of a particular sensitivity mitigation action for similar sensitive content; and/or based on settings or preferences, which can include user feedback or inputs (to the GUIs of FIGS. 3, 4, and 5) or configured by the user or an administrator, such as user configurations/feedback 246.

In one example, the weight or category relates to the extensiveness of the modifications made to a segment determined to have sensitive content and may be based on any suitable data structure stored in storage 225, such as a linear data structure that includes a list or an array; a tree data structure that includes binary, heap, and/or space partitioning; a table; or a hash data structure that includes a distributed hash table, a hash tree; or any suitable linear or non-linear data structure. For example, the sensitivity analyzer 280 maps the determined weight or category to a level of modifications made to the segment. For example, the sensitivity analyzer 280 determines that a segment having a high weight should be removed from the meeting presentation for the meeting presentation modifier 292 to generate the modified meeting presentation.

In some embodiments, the sensitivity analyzer 280 determines (or meeting data feature determination logic 230 includes instructions for determining) a level of relatedness score between segments (such as between a first segment and a second segment) that are compared based on respective meeting data features. For embodiments where relatedness is based on a similarity comparison, the relatedness score may comprise a similarity score or a similar indication of similarity. In some embodiments, a measure of semantic similarity is determined between (or among) meeting data features of each of two or more segments being compared. The measure of semantic similarity may be utilized to indicate relatedness such that a higher similarity indicates greater relatedness of the segments in the comparison. Based on the relatedness score, compared segments having a high relatedness score (or a relatedness score indicating the highest degree of relatedness, which may be determined using a threshold or may be a relative comparison versus comparisons of other segments in the meeting) are determined as a likely having related content and thus less likely to have sensitive content.

In some embodiments, at least one meeting feature for a first segment of a meeting is compared against at least one meeting feature from each of the other segments, which may comprise all of the segments for a completed meeting or only those segments having occurred so far for a meeting that is still in progress. Based on the comparison a relatedness, such as a similarity score, is determined with respect to the particular segment versus the other segments of the comparison. Based on the comparison, where the particular segment is different than the other segments, it may be inferred that aspects of the particular segment are unrelated to the other segments, and thus the segment (or an aspect of the segment) may be determined as more likely to contain sensitive content.

The sensitivity mitigation engine 290 is generally responsible for applying a sensitivity mitigation action to a portion (for example, segment) of the meeting presentation determined by the sensitivity analyzer 280 as having sensitive content. In one embodiment, the sensitivity mitigation action is determined based at least in part on the output of sensitivity analyzer 280, such as a classification or ranking of sensitive content, as determined by the sensitivity analyzer 280. In some embodiments, the determination and/or application of a sensitivity mitigation action by sensitivity mitigation engine 290 is additionally or alternatively based on meeting data features determined by meeting data features determiner 260 and/or user configurations/feedback 246.

In one example, the sensitivity mitigation action applied to a meeting segment that is determined by sensitivity analyzer 280 to be high sensitivity content may include altogether removing the meeting segment having the high sensitivity content. As another example, the sensitivity mitigation action applied to the medium sensitivity content may include automatically modifying an aspect of the segment having the medium sensitivity content, such as by removing audio, removing visual content, blurring certain objects or text, blacking out the screen, fast-forwarding presentation of the segment, and so forth. As another example, the sensitivity mitigation action applied to the low sensitivity content may include tagging the segment as a flagged candidate segment to be presented to a user (for example, an authorized personnel) via a GUI, such as the GUIs of FIG. 3, 4, or 5, as part of a post-processing process. In this manner, the user can choose whether to apply a sensitivity mitigation action to the flagged candidate segment, to customize the sensitivity mitigation action, or customize the start and end time of the flagged candidate segment, to name a few. In another embodiment, the sensitivity mitigation engine 290 determines a corresponding sensitivity mitigation action for the segments containing sensitive content (as determined by the sensitivity analyzer 280) and presents the segments as flagged candidate segments for user approval or customization, for example, via the GUIs of FIG. 3, 4, or 5.

In one embodiment, in response to the sensitivity analyzer 280 determining that a segment includes sensitive content that is classified or ranked as high sensitivity audio content (for example, inappropriate words spoken by the audience), the sensitivity mitigation engine 290 determines the sensitivity mitigation action to include muting or distorting audio occurring during the segment containing high sensitivity audio content. In this example, the visual content remains unchanged, since the sensitivity analyzer 280 did not determine the segment to have any sensitive visual content. In one embodiment, in response to the sensitivity analyzer 280 determining that a segment includes sensitive content that is classified or ranked as high sensitivity visual content (for example, the presenter's gambling content accidentally shared on the screen), the sensitivity mitigation engine 290 determines the sensitivity mitigation action to include visually altering, such as blacking out, the visual content occurring during the segment containing high sensitivity audio content. In this example, the audio content remains unchanged (for example, to preserve the audio in the meeting presentation), since the sensitivity analyzer 280 did not determine the segment to have any sensitive audio content.

In some embodiments, the sensitivity mitigation engine 290 uses the corresponding weight of the segment to rank, prioritize, or filter sensitive mitigation actions, such that only sensitive mitigation actions (having high or low weights) are applied to corresponding segments and used by the meeting presentation modifier 292 to generate the modified meeting presentation. Some embodiments of the sensitivity mitigation engine 290 are configured to filter sensitivity mitigation actions so only certain sensitivity mitigation actions, such as those corresponding to segments having a certain weight or those having certain meeting data features, are applied by the sensitivity mitigation engine 290 and used by the meeting presentation modifier 292 to generate the modified meeting presentation. For example, sensitivity mitigation actions corresponding to segments that do not have high or low weights, such as those that do not have the top 10% of the highest weight value or the lowest 10% of the lowest weight value, are not applied, but may be accessed by scrolling down or expanding a GUI element listing other sensitivity mitigation actions. Although the previous example included only applying those sensitivity mitigation actions corresponding to segments having the highest or lowest percentage of weight values, it should be understood that any portion of the total sensitivity mitigation actions may be filtered out, such that only a threshold number of segments, the highest (or lowest) weighted segment, or a segment having a pre-set meeting data feature have their corresponding sensitivity mitigation actions applied to generate the modified meeting presentation by the meeting presentation modifier 292. Indeed, any suitable portion (or subset) of all the sensitivity mitigation actions may be filtered out and not applied to avoid computationally applying sensitivity mitigation actions for all segments determined by the segment determiner 270.

In some embodiments, a sensitivity mitigation action can be selectively applied by sensitivity mitigation engine 290 to the meeting presentation to online meeting attendees according to an authorization level of the attendees. In particular, information about a particular online meeting attendee, such as a level of authorization of content the attendee is permitted to access, is utilized to determine whether meeting content shared with that attendee is sensitive with respect to that attendee. In some instances, level of authorization is determined based on a user identification, user-device identification, title, or role associated with the attendee. For example, the meeting content shared during the presentation of an online meeting may comprise human resources (HR) information about a particular employee. Where the meeting attendees include HR staff who are authorized to view the HR information and the meeting attendees also include other employees who are not authorized to view the HR information, then a sensitivity mitigation action may be selectively applied to the meeting content that is shared with those other employees. Accordingly, the meeting content regarding the HR information that is presented on the user devices of those other employees (who are not authorized to view the HR information) will shows partial removal of the content (for example, blurring or masking the HR information). However, the meeting content that is presented on the user devices of the HR staff who are permitted to view the HR information will not have the sensitivity mitigation action applied and thus will see all of the HR information that is shared.

Although the embodiments discussed with respect to the sensitivity analyzer 280 and the sensitivity mitigation engine 290 are discussed as determining and performing certain sensitivity mitigation actions, it should be understood that the sensitivity mitigation action may include any suitable action for rectifying any issues associated with any sensitive content being presented or with the meeting presentation having any sensitive content. For example, the sensitivity mitigation action includes altering audio by muting the audio, distorting the audio, replacing the audio of the meeting presentation with other noise, or bleeping the audio. As another example, the sensitivity mitigation action includes altering the visual content by removing the visual content, applying a solid color overlay to the visual content, or blurring certain objects associated with the visual content. Additional examples of sensitivity mitigation actions include elevating a segment to a flagged candidate segment, notifying a user of the flagged candidate segment, and allowing the user to selectively apply or customize a sensitivity mitigation action to the flagged candidate segment.

Continuing with FIG. 2, the meeting presentation modifier 292 is responsible for generating a modified meeting presentation. In one example, the modified meeting presentation refers to a media file of the meeting presentation that has been edited to rectify issues associated with sensitive content being initially contained in the initial version of the meeting presentation. In one example, the modified meeting presentation corresponds to an edited version of the meeting presentation that has the audio content and/or visual content of a portion of the meeting presentation edited based on the sensitivity mitigation action determined by the sensitivity mitigation engine 290. In one embodiment, the meeting presentation modifier 292 applies the sensitivity mitigation action at or near real time during the meeting. Alternatively or additionally, certain embodiments of the meeting presentation modifier 292 apply the sensitivity mitigation action to generate the modified meeting presentation at the conclusion of the meeting, for example, as part of a post-processing automated operation.

In some embodiments, the meeting presentation modifier 292 accesses user configurations/feedback 246 in storage 225 to modify the meeting presentation. For example, the user configurations/feedback 246 stores user approvals or denials of sensitivity mitigation actions applied to certain flagged candidate segments. The user approvals or denials can be input into any suitable GUI, such as the GUIs depicted in FIGS. 3, 4, and 5. In one example, the meeting presentation modifier 292 receives an indication of a user approval to apply a sensitivity mitigation action to a flagged candidate segment and generates the modified meeting presentation with the sensitivity mitigation action applied to the flagged candidate segment. In another example, the meeting presentation modifier 292 receives an indication of a user denial to apply a sensitivity mitigation action to a flagged candidate segment and generates the modified meeting presentation with the sensitivity mitigation action not applied to the flagged candidate segment.

Example system 200 of FIG. 2 also includes storage 225. Storage 225 generally stores information including data, computer instructions (for example, software program instructions, routines, or services), logic, profiles, and/or models used in embodiments described herein. In an embodiment, storage 225 comprises a data store (or computer data memory). Further, although depicted as a single data store component, storage 225 can be embodied as one or more data stores or in the cloud.

As shown in example system 200 of FIG. 2, storage 225 includes meeting data feature determination logic 230 and sensitivity logic 235, as previously described. Storage 225 also includes an example embodiment of meeting data 240, user accounts and devices 242, user-meeting data 244, and user configurations/feedback 246. In some embodiments, the information stored in storage 225 is available to other components of example system 200.

User accounts and devices 242 generally includes information about user devices accessed, used, or otherwise associated with a user, and/or information related to user accounts associated with the user, for example, which are used for accessing or collecting user data for a user (such as a user interacting with a meeting presentation). For example, information of user accounts and devices 242 comprises at least one of: online or cloud-based accounts (for example, email, social media) such as a Microsoft® MSA account or a Microsoft 365 account; other accounts, such as entertainment or gaming-related accounts (for example, Xbox®, Netflix®, online game subscription accounts, or similar account information); communication data that relates to such accounts, such as user emails, texts, instant messages, calls, other communications, and other content; social network accounts and data, such as news feeds; online activity; and calendars, appointments, application data, other user accounts, or the like. Some embodiments of user accounts and devices 242 store information across one or more databases, knowledge graphs, or data structures. As described previously, certain information stored in user accounts and devices 242 is determined from meeting-data collection component 210 or contextual feature determiner 268 (including one or more of its subcomponents).

As described previously, user-meeting data 244 generally includes information about a user. In one embodiment, user-meeting data 244 includes user data received from meeting-data collection component 210 or user data determined by contextual feature determiner 268 (or its subcomponents), which includes user-related activity data, a context or contextual information, and user data features (or structured or semi-structured user data). In one embodiment, user-meeting data 244 includes information regarding a transcript of spoken content delivered during the meeting, or a chat transcript of messages exchanged privately or publicly during the meeting. In certain embodiments, user-meeting data 244 includes information regarding the user's interactions with one or more meeting presentations, such as the number of interactions, frequency, or other data regarding the interactions the user had during the meeting or past meeting recordings that are relevant to the user.

User configurations/feedback 246 generally includes user settings or preferences associated with embodiments described herein. By way of example and not limitation, such settings include user configurations or preferences about the various thresholds described herein, confidence values associated with inferences, explicitly defined settings regarding user data used to determine a segment representation and/or sensitivity mitigation actions, preferences regarding application of the sensitivity mitigation actions, preferences or configurations regarding the presentation of a GUI (such as the example GUIs of FIGS. 3, 4, and 5) by computing applications and services used by the user, or other preferences or configuration settings for any of the embodiments described herein. In one embodiment, the sensitivity analyzer 280 or the sensitivity mitigation engine 290 updates the meeting data feature determination logic 230 and sensitivity logic 235 based on the user configurations/feedback 246. In this manner, the meeting data feature determination logic 230 and sensitivity logic 235 are updated based on labeled data from the user configurations/feedback 246 to improve the personalization and accuracy of future determined sensitivity mitigation actions and/or modified meeting presentations.

Figure 5:
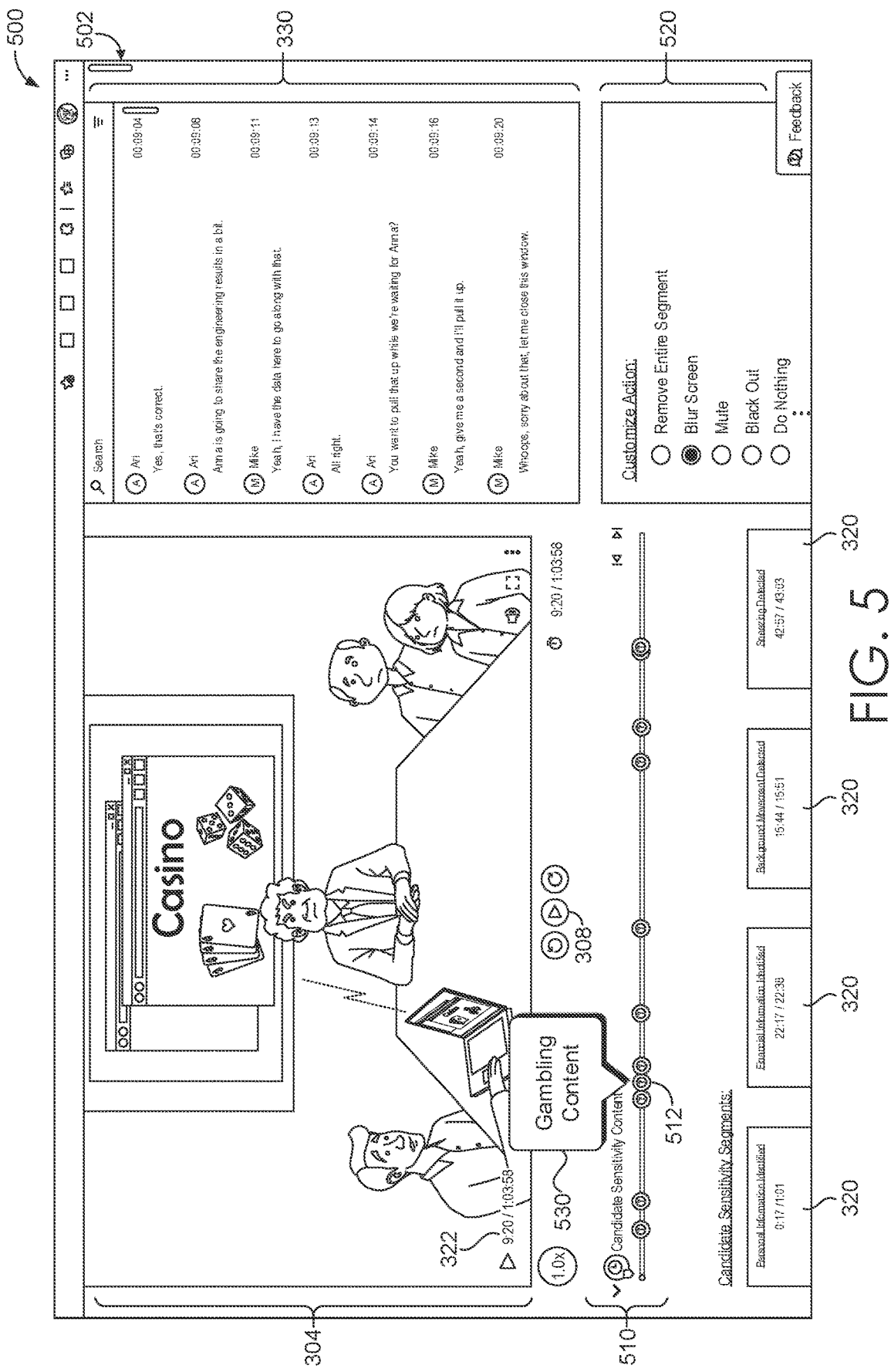
FIG. 5 illustratively depicts example schematic screenshots from a personal computing device showing aspects of example graphical user interfaces, in accordance with an embodiment of the present disclosure.

Example meeting data 240, in general, comprises data associated with the meeting data feature determined by the meeting data feature determiner 260, data associated with an initial meeting presentation captured by the meeting-data collection component 210, and data associated with the modified meeting presentation generated by the meeting presentation modifier 292, data associated with the sensitivity mitigation action generated by the sensitivity mitigation engine 290 and customized by a user (via a GUI, such as the GUIs of FIGS. 3, 4, and 5), and any suitable data helpful in generating the interfaces of FIGS. 3, 4, and 5. In one embodiment, the presentation component 220 receives the meeting data 240 to generate the interfaces of FIGS. 3, 4, and/or 5. For example, the meeting data 240 includes data associated with the segments, sensitivity content, and a sensitivity mitigation action, and so forth.

Example system 200 includes a presentation component 220 that is generally responsible for presenting content including aspects of an indication of a flagged candidate segment, an indication of a corresponding sensitivity mitigation action, and a modified meeting presentation. In one example, the content is presented via one or more presentation components 1016, as described in FIG. 10. In one embodiment, presentation component 220 comprises one or more applications or services on a user device across multiple user devices or in the cloud. For example, presentation component 220 manages the presentation of the modified meeting presentation based on the sensitivity mitigation action across multiple user devices associated with that user, which the user accesses via a mobile device, laptop, or VR headset, and so forth. For example, presentation component 220 determines which user device(s) content is presented on and/or how much content is presented, presents a GUI for customizing application of a sensitivity mitigation action; presents a GUI that plays back the modified meeting presentation; presents the meeting data 240; and/or presents any data associated with any other components of system 200. In one embodiment, presentation component 220 presents meeting data 240, including any substitutions, reorganizations, or highlights as directed by presentation logic, meeting data feature determiner 260, segment determiner 270, sensitivity analyzer 280, sensitivity mitigation engine 290, meeting presentation modifier 292, and/or data stored in storage 225.

In some embodiments, presentation component 220 or the meeting presentation modifier 292 presents a GUI element notifying a user (such as a presenter) that the meeting contains sensitive content as determined by the sensitivity analyzer 280. The GUI element notifying the user may include any suitable visual or auditory indication, such as an icon on the screen, a sound, and the like. For example, when a presenter accidentally shares a screen containing gambling information, the sensitivity analyzer 280 may determine at or near real time that sensitive content has been shared based on a comparison of a first aspect and a second aspect of the meeting. The sensitivity mitigation engine 290 may determine at or near real time that blacking out the screen would remedy the issues associated with sharing this sensitive content. Thereafter, in this example, the meeting presentation modifier 292, at or near real time, blacks out the screen for audience members and as part of the meeting presentation; additionally, the meeting presentation modifier 292 presents a visual indication (such as a colored bar at the top of the screen) notifying the presenter that sensitive content has been shared. In one embodiment, the meeting presentation modifier 292 presents a visual indication until the sensitivity analyzer 280 determines that sensitive content is no longer being presented, for example, based on a comparison of a first aspect and a second aspect of the meeting. In this manner, a presenter can be notified when sensitive content is being presented to manually adjust what is being displayed or discussed. In one embodiment, the meeting presentation modifier 292 or the presentation component 220 presents a GUI, such as the GUIs depicted in FIGS. 3, 4, and 5, to the presenter or any suitable user asking for approval of the sensitivity mitigation action after the meeting concludes.

Some embodiments of the meeting presentation modifier 292 assemble or format the modified meeting presentation for consumption by a computing application or service. For example, as described previously, segment determiner 270 determines a set of segments for a particular computing application (for example, mobile application, VR application, or desktop application), and the sensitivity analyzer 280 determines sensitive content contained within the segments, and the sensitivity mitigation engine 290 determines a sensitivity mitigation action to apply to the corresponding segment to at least partially remove a portion of the sensitive content, such as the audio or visual aspects.

In one embodiment, the presentation component 220 presents one or more selectable controls for customizing or controlling application of a sensitivity mitigation action to a flagged candidate segment. In some embodiments, the selectable controls provide functionality enabling a user to control application of a sensitivity migration action in-meeting or post-meeting. Thereafter, in one example, the presentation component 220 can present, in a player region, the modified meeting presentation that includes the sensitivity mitigation action applied to the flagged candidate segment based on the user inputs to the selectable controls. In this manner, a user is able to consume the modified meeting presentation without being exposed to sensitive content that has been removed based on embodiments of the segment determiner 270, the sensitivity analyzer 280, the sensitivity mitigation engine 290, and the meeting presentation modifier 292, thereby enhancing the user experience by removing sensitive content, at or near real time or as part of a post-processing operation, and reducing resources associated with manually editing a meeting presentation in an attempt to remove sensitive content.

In one embodiment, the meeting presentation modifier 292 generates user interface elements associated with or used to facilitate the user customization of sensitive content (such as shown in connection with FIGS. 3 and 4). Such elements can include icons or indicators, graphics buttons, sliders, menus, audio prompts, alerts, alarms, vibrations, pop-up windows, notification-bar or status-bar items, in-app notifications, queries, prompts, or other similar features for interfacing with a user. It should be understood that, in certain embodiments, the meeting presentation modifier 292 may be omitted and corresponding functionality may be instead performed by any component of system 200.

With reference now to FIGS. 3, 4, and 5, a number of example schematic screenshots from a personal computing device are illustratively depicted, showing aspects of example graphical user interfaces (GUIs) that include presentation of various flagged candidate segments and corresponding sensitivity control GUI element and other GUI elements for controlling application of a corresponding sensitivity mitigation action, as described herein. The example flagged candidate segments shown in FIGS. 3, 4, and 5 are determined for a particular user and contextualized for a user, such as described in connection with the components of system 200 of FIG. 2. The example flagged candidate segments and corresponding sensitivity mitigation actions are determined by embodiments of the meeting data feature determiner 260, segment determiner 270, sensitivity analyzer 280, sensitivity mitigation engine 290, meeting presentation modifier 292, and/or data stored in storage 225. In one embodiment, the GUIs are generated by embodiments of the meeting presentation modifier 292 and presentation component 220 of FIG. 2.

Turning to FIG. 3, an example schematic screen display 300 is shown, which represents a computing device, such as user device 102n, discussed above with respect to FIG. 1. Screen display 300 is shown having a GUI 302, which could be produced on the computing device screen display 300 by any of a number of different computer programs, applications or other displays discussed herein. In one embodiment, the GUI 302 is automatically presented to an authorized user (such as a presenter, manager, or administrator) to empower the administrator to approve, reject, or customize application of a sensitivity mitigation action to a particular flagged candidate segment. In one embodiment, the presentation component 220 and/or the meeting presentation modifier 292 of FIG. 2 generate the GUI 302 (or any other the GUIs described herein). In some embodiments, the GUI 302 includes a stream region 304 and a sensitivity control GUI element 306. In this example embodiment, stream region 304 displays the recording of the meeting presentation. In addition or alternatively, stream region 304 displays video for meeting happening in real-time. The stream region 304 is capable of playing back a video stream that has been formatted as MPEG-4 Part 14 (MP4) file, a MOV file, a QuickTime File Format (QTFF) file, a WMV file, an AVI file, an Advanced Video Coding High Definition (AVCHD) file, a WebM file, MKV file, or any other suitable video compression or format.

In some embodiments, the sensitivity control GUI element 306 includes selectable and configurable controls for controlling application of the sensitivity mitigation action. In the depicted example, the sensitivity control GUI element 306 includes an acceptance control 308 and a rejection control 310. In one embodiment, a user input, such as selection of the acceptance control 308, causes a sensitivity mitigation action be applied. In this example, applying the sensitivity mitigation action causes the segment containing the sensitive content to be altered, as indicated by the prompt 314a in sensitivity control GUI element 306: "Do you want to remove this content from the meeting?" In some embodiments, an explanation 313 is provided to the user. Explanation 313 provides context for why the particular sensitive content was identified for consideration of sensitivity mitigation, such as removal. In one embodiment, the format or size, such as a number of characters making up the explanation 313 and/or prompt 314a, may be based on a screen size or a level of sensitivity associated with the corresponding sensitive content. In one embodiment, an icon or link is provided to the explanation 313, thereby enabling the user to optionally access the explanation. In some embodiments, the explanation 313 and prompt 314a, additionally or alternatively, are formatted in any suitable manner, such as including symbols or images to save space, while communicating a similar message to a user.

Additionally, in one embodiment, a user input, such as selection of the rejection control 310, causes the sensitivity mitigation action be rejected and thus not be applied. In this example, rejecting application of the sensitivity mitigation action (for example, by selecting rejection control 310) causes the segment containing the sensitive content to remain unaltered so that the sensitive content is included in the modified meeting presentation. In some embodiments, in instances where a sensitivity mitigation action was applied in near-real-time during the meeting, such as by obscuring the sensitive content as shown in FIG. 3, selection of the rejection control 310 removes the sensitivity mitigation for the segment. (Thus for example, the obscured content such as shown in FIG. 3 would be restored so that it appeared as shown in FIG. 4.)

In some embodiments, the sensitivity control GUI element 306 includes a customization control 312. In one embodiment, a user input, such as selection of the customization control, allows the user to modify the sensitivity mitigation action. For example, the customization control 312 includes a drop-down menu, check boxes, search fields, and the like for selecting another sensitivity mitigation action or for customizing the length (for example, the start time and end time of the segment containing sensitive content.) The sensitivity mitigation action recommended in the example depicted in FIG. 3 includes altogether removing the segment containing the sensitive content. Selection of the customization control 312 allows the user to then select alternative sensitivity mitigation actions, such as blurring or obscuring visual aspects of the sensitive content, muting or altering the audio, and so forth.

In the depicted embodiment of FIG. 3, the GUI 302 includes a plurality of candidate segments, such as candidate segments 320a, 320b, 320c, and 320d that have been flagged or otherwise determined to likely include sensitive content. In some embodiments, the candidate segments 320 are presented in any suitable format, such as a list, selectable icons, on a navigable window, and so forth. In some embodiments, the GUI includes a search field to search the video for certain sensitive content, search for certain meeting presentations, or search for certain candidate segments 320 within a particular meeting presentation. In one example, selection of a particular flagged candidate segment 320b causes a corresponding sensitivity control GUI element 306 to be presented to empower a user to customize application of the sensitivity mitigation action for that particular candidate segment 320b. Alternatively or additionally, selection of the toggle controls 321 on the sensitivity control GUI element 306 allows the user to control application of another sensitivity mitigation action determined for another flagged candidate segment, such as candidate segment 320c. Although the sensitivity control GUI element 306 illustrated in FIGS. 3 and 4 shows an example of sensitive content that is related to gambling, selection of any one flagged candidate segments 320a-320d from the listing of flagged candidate segments causes the sensitivity control GUI element 306 to be updated to allow for control of application of a sensitivity mitigation action for the correspondingly selected flagged candidate segment 320a-320d. For example, selection of the "personal information identified" flagged candidate segment 320a causes the sensitivity control GUI element 306 to be updated to display text corresponding to a determined sensitivity mitigation action and similar controls for controlling application of the sensitivity mitigation action for candidate segment 320a.

The GUI 302 may include any additional suitable engageable controls and regions. For example, to facilitate navigating to various portions of the meeting presentation and to facilitate tracking progression through the video, an embodiment of the GUI 302 includes a timeline, a play indicator 322 that is selectable to pause and continue playing the meeting recording presented on the stream region 304, and a transcript region 330. In one embodiment, the transcript region 340 displays a transcript associated with content playing back on the stream region 304. In one example, the transcript region 340 includes alphanumeric characters correlating to the audio presented in the stream region 304. Alternatively or additionally, the transcript region 340 includes text corresponding to a chat that was active during the meeting. For example, the transcript region 340 generates a live transcript of the audio associated with the meeting recording playing in the stream region 304. In one embodiment, the transcript region 340 presents audio that has been indexed based on a speaker (as determined by the speaker determiner 262 of FIG. 2). In this manner and as illustrated in the transcript region 340, a block of text and associated timestamps may be presented proximate to text identifying the speaker. However, it should be understood that the text in the transcript region 340 may be indexed based on any additional or alternative meeting data feature, such as based on topic (as determined by the topic/keyword determiner 263). For example, the text in the transcript region 340 is color coded based on topic.

FIG. 4 illustratively depicts an example schematic screenshot 400 from a personal computing device showing aspects of an example GUI 402, in accordance with an embodiment of the present disclosure. Whereas the example screenshot of FIG. 3 depicts the sensitivity mitigation applied to sensitive content of the meeting, and the user asked, via prompt 314a of the sensitivity control GUI element 306, if the user wants to remove the sensitive content from the meeting recording; in FIG. 4 the sensitivity mitigation action is not yet applied to the sensitive content identified in the meeting recording, and the user is instead asked via the sensitivity control GUI element 306, if the user want to keep the sensitive content in the meeting. However, it should be understood that, in some embodiment, a sensitive content mitigation action is automatically applied during the live meeting to prevent live viewers from viewing the meeting recording (as depicted in the cartoon in FIG. 6B) but not necessarily applied as part of the post-processing process where the user is asked if the user wants to remove the sensitive content. In one example, the embodiments disclosed herein are performed during the latency period associated with streaming the live meeting, such that the sensitive content is removed from the live meeting at or near real-time.

FIG. 5 illustratively depicts an example schematic screenshot 500 from a personal computing device showing aspects of an example GUI 502, in accordance with an embodiment of the present disclosure. Whereas the example screenshots of FIGS. 3 and 4 includes the sensitivity control GUI element 306 as a pop-up menu, the example screenshot 502 of FIG. 5 includes the functionality of the sensitivity control GUI element of FIGS. 3 and 4 in other GUI elements. In particular, the depicted embodiment includes, among other elements, (1) a sensitivity timeline 510 having indications 512 of occurrences of sensitive content, (2) an action customization region 520.

In some embodiments, the sensitivity timeline 510 has a length that corresponds to a duration of the meeting recording. For example, the leftmost side corresponds to a start of the meeting and the rightmost side corresponds to an end of the meeting recording. A user may navigate to any portion of the meeting recording by selecting a point between the leftmost end and the rightmost end of the sensitivity timeline 510. As depicted, the sensitivity timeline 510 includes the indications 512 of occurrences of sensitive content. As illustrated, the indications 512 of occurrences of sensitive content are presented on the sensitivity timeline 510 to correspond to a timing, relative to the entire meeting recording, during which the sensitive content occurred. In one example, a user input indicative of a selection of a particular indication 512 causes a text bubble 530 corresponding to the particular indication 512 to be presented. In one example, the text bubble 530 includes a brief description or an image representing or indicative of the type of sensitive content associated with the particular indication 512. In the illustrated example, the text bubble 530 corresponds to "gambling content." In some embodiments, selection of the indication 512 causes the meeting recording to playback the portion of the meeting recording corresponding to the selected indication 512 and that includes the corresponding sensitive content. In this manner, a user can view the corresponding segment of the meeting recording containing the identified sensitive content to allow user to better assess whether to accept the sensitivity mitigation action or to customize the sensitivity mitigation action.

With regarding to empowering a user to customize the sensitivity mitigation action, the action customization region 520 includes a list of sensitivity mitigation actions that a user can instead apply to the flagged candidate segment, for example, selected from the sensitivity timeline 510. For example, for the selected flagged candidate segment identified as containing sensitive content that includes gambling content, the action customization region 520 includes sensitivity mitigation actions including, but not limited to, removing the entire segment, blurring the screen (which the user has chosen in this example), muting the audio, blacking out the sensitive content, doing nothing (for example, keeping the identified content), and so forth.

In some embodiments, the user inputs indicative of an approval, rejection, or customization of a sensitivity mitigation action are used to train a machine learning model such as a model used by sensitivity logic 235. In some embodiments, these user inputs can be made via any GUI element, such as the GUI elements associated with the GUIs 302, 402, or 502 of FIGS. 3, 4, and 5, respectively. As a first example, flagged candidate segments for which the user chooses to "do nothing", as selected via the action customization region 520 are recorded and a negative label is associated with this flagged candidate segment. In turn, the sensitivity logic 235 can be tuned (for example, weights of certain features are updated) and the corresponding machine learning model trained to not identify similar segments as containing sensitive content. In this manner, embodiments of the sensitivity analyzer 280 of FIG. 2 can be refined to improve accuracy.

As a second example, flagged candidate segments for which the user chooses to apply a sensitivity mitigation action, as selected via the action customization region 520, that is different than the suggested sensitivity mitigation action are recorded and a decreased weight or negative label is associated with this sensitivity mitigation action associated with this flagged candidate segment. In turn, the sensitivity logic 235 can be tuned (for example, weights of certain features are updated) and the corresponding machine learning model trained to assign similar sensitivity mitigation actions to similar segments containing similar sensitive content. In this manner, embodiments of the sensitivity mitigation engine 290 of FIG. 2 can be refined to improve accuracy of the automated sensitivity mitigation engine 290.

Although the embodiments illustrated in FIGS. 3, 4, and 5 depict respective GUIs for controlling application of a sensitivity mitigation action post-meeting, similar or alternative controls are employed for controlling application of the sensitivity mitigation action in-meeting. In one embodiment, while a user is sharing her/his screen, a selectable control, such as the sensitivity control GUI element 306, is presented on the user's screen so that the user can controlling application of the sensitivity mitigation action. The selectable control can be presented on the screen of the user presenting or on another authorized user, such as the presenter's boss or any suitable authorized personnel. As a first example, the sensitivity mitigation action is automatically applied at or near-real time while the user is presenting. The sensitivity control GUI element 306 can include an indication to notify the user that the sensitivity mitigation action is being applied. A user can then manually disable application of the sensitivity mitigation action or change the sensitivity mitigation action (for example, from removing visual content to removing audio content). Similarly, the sensitivity mitigation action, in one example, is disabled when the sensitivity analyzer 280 determines that sensitive content is no longer being presented.

As a second example of controlling application of a sensitivity mitigation action in-meeting, the sensitivity mitigation action is applied only after a user approves of the application. For example, when sensitive content is detected (for example, by sensitivity analyzer 280), a user is notified that sensitive content has been detected and a user then selects whether to apply a sensitivity mitigation action or which sensitivity mitigation action to apply. As a third example, when the sensitivity mitigation action is applied in-meeting, the screen on which the user is presenting may change so as to serve as a notification that sensitive content has been identified and that a sensitivity mitigation action is being applied. Example changes to the screen include gray-scaling the screen, generating an icon (such as an exclamation mark at the top of the screen), playing a sound, or any other visual, auditory, or sensory output to notify the user. In some embodiments, the user inputs to control in-meeting application of the sensitivity mitigation action are used as labeled data to tune the sensitivity logic 235 (for example, weights of certain features are updated) and train the corresponding machine learning model. In this manner, embodiments of the sensitivity mitigation engine 290 of FIG. 2 can be refined to improve accuracy of the automated sensitivity mitigation engine 290.

Figure 7:
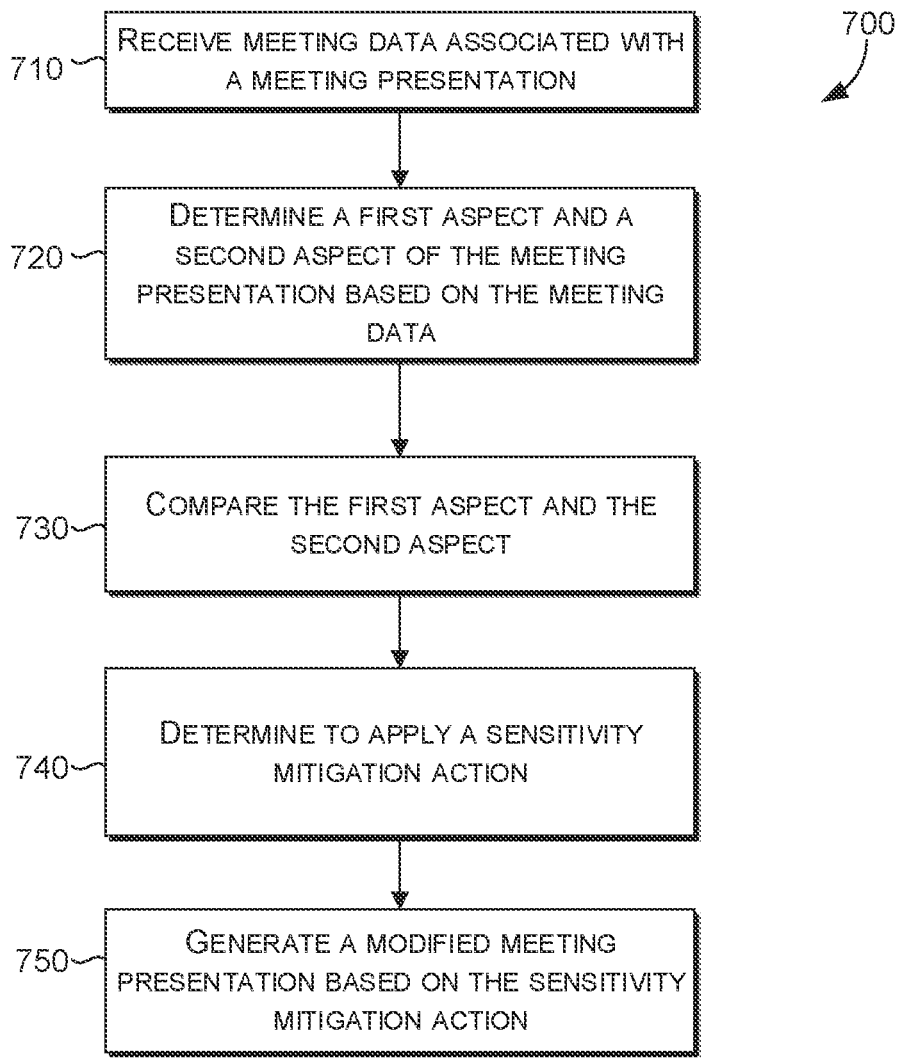
FIG. 7 depicts a flow diagram of a method for programmatically generating a modified meeting presentation based on a sensitivity mitigation action, in accordance with an embodiment of the present disclosure.
Figure 8:
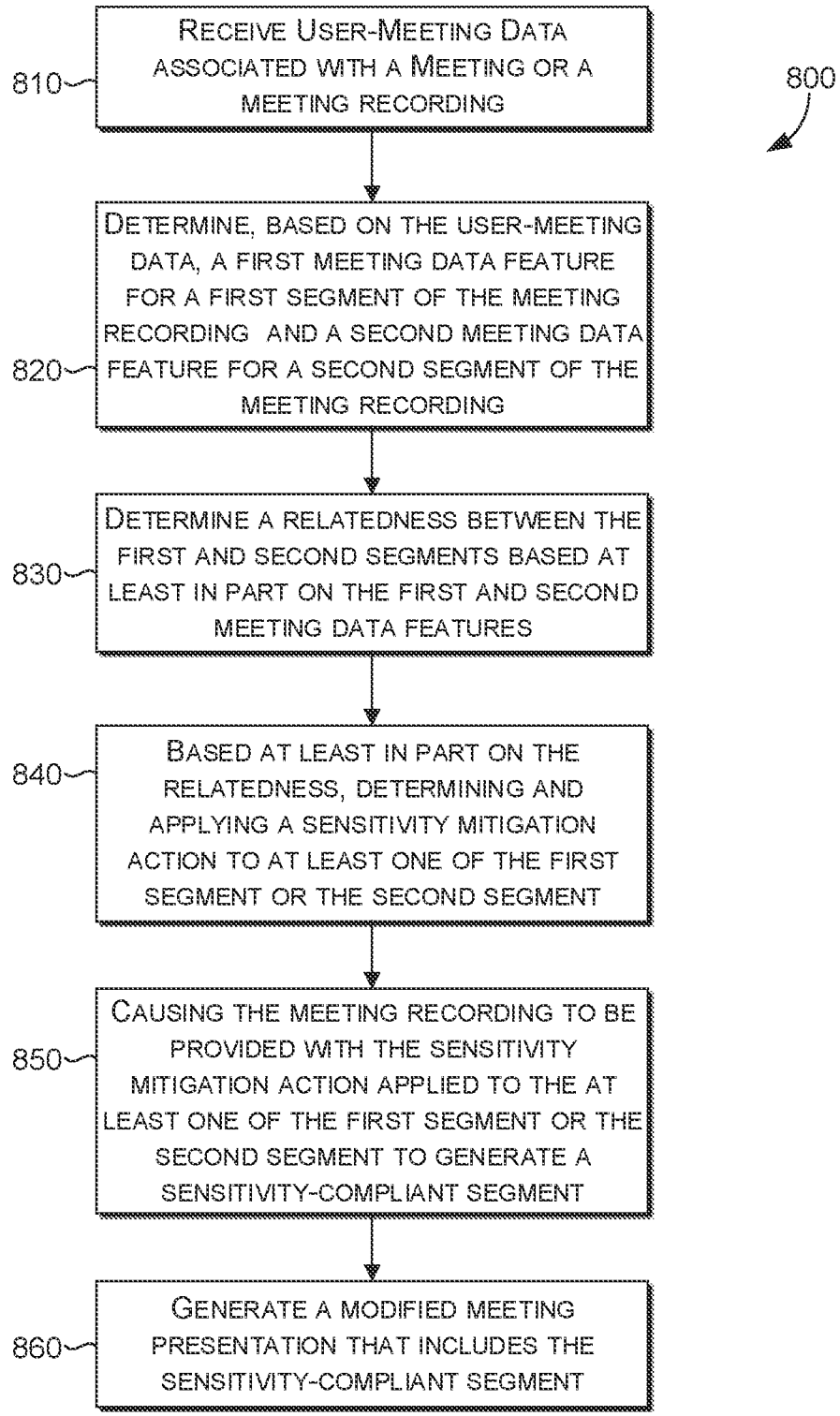
FIG. 8 depicts a flow diagram of a method for programmatically generating a modified meeting presentation that includes a sensitivity-compliant segment, in accordance with an embodiment of the present disclosure.
Figure 9:
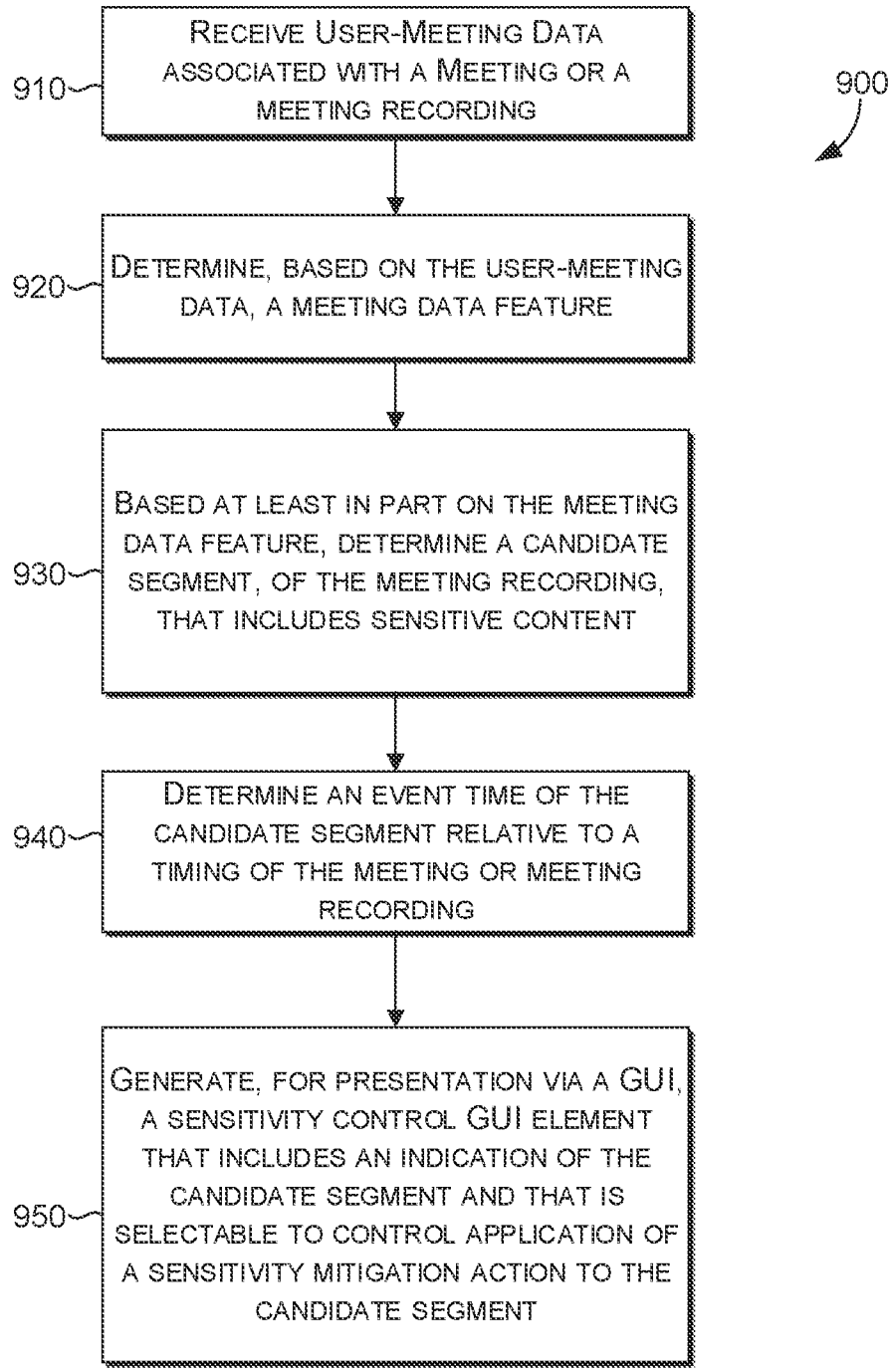
FIG. 9 depicts a flow diagram of a method for programmatically generating, for presentation on a graphical user interface (GUI), a sensitivity flagged GUI element selectable to control application of a sensitivity mitigation action, in accordance with an embodiment of the present disclosure.

Turning now to FIGS. 7, 8, and 9, aspects of an example process flows 700, 800, and 900 are illustratively depicted for some embodiments of the disclosure. Process flows 700, 800, and 900 each comprise a method (sometimes referred to herein as method 700, 800, and 900) that may be carried out to implement various example embodiments described herein. For instance, at least one of process flows 700, 800, or 900 are performed to programmatically determine a sensitivity mitigation action or generate a modified meeting presentation based on the sensitivity mitigation action, which are used to provide any of the improved electronic communications technology or enhanced user computing experiences described herein.

Each block or step of process flow 700, process flow 800, process flow 900, and other methods described herein comprises a computing process that may be performed using any combination of hardware, firmware, and/or software. For instance, various functions are carried out by a processor executing instructions stored in memory, such as memory 1012 described in FIG. 10 and/or storage 225 described in FIG. 2. The methods may also be embodied as computer-usable instructions stored on computer storage media. The methods may be provided by a stand-alone application, a service or hosted service (stand-alone or in combination with another hosted service), or a plug-in to another product, to name a few. For example, the blocks of process flow 700, 800, and 900 correspond to actions (or steps) performed (as opposed to information to be processed or acted on) and carried out by one or more computer applications or services, which operate on one or more user devices (such as user device 102*a* of FIG. 1), servers (such as server 106 of FIG. 1), and/or are distributed across multiple user devices, and/or servers, or by a distributed computing platform, and/or are implemented in the cloud, such as described in connection with FIG. 11. In some embodiments, the functions performed by the blocks or steps of process flows 700, 800, and 900 are carried out by components of system 200, as described in connection to FIG. 2.

With reference to FIG. 7, aspects of example process flow 700 are illustratively provided for generating a modified meeting presentation, and, in some embodiments, determining a sensitivity mitigation action applied to generate at least a portion of the modified meeting presentation. In one example, example process flow 700 is performed to generate the modified meeting presentations discussed with respect to and/or illustrated in FIG. 3, 4, 5, 6A, or 6B, and as described in connection with FIG. 2.

At a block 710, method 700 includes receiving meeting data associated with a meeting presentation. Embodiments of block 710 perform operations including receiving meeting data, as discussed in FIG. 2, with respect to the meeting-data collection component 210 and the meeting feature data determiner 260. In particular, meeting data may include any data associated with a meeting, a user such as a meeting attended by the user, or a meeting presentation associated with a user, an example of which includes meeting information, transcript information, contact information, and other user or meeting-related data discussed herein.

At block 720, method 700 includes determining a first aspect and a second aspect of the meeting presentation based on the meeting data. Embodiments of block 720 perform operations including determining aspects of the meeting, such as, but not limited to, visual and audio aspects, as well as the meeting data features determined by the meeting data feature determiner 260. In some embodiments, the first aspect comprises text extracted from a visual image and the second aspect comprises a portion of a transcript determined from audio. In some embodiments, the meeting data feature determiner 260 of FIG. 2 determines (block 720) the aspects as discussed with respect to FIG. 2.

At block 730, method 700 includes comparing the first aspect and the second aspects. In one example, comparing (block 730) the first aspect and the second aspect comprises comparing at least one meeting data feature corresponding to the first aspect with at least one meeting data feature corresponding to the second aspect. In particular, the meeting data features may be determined as described in connection with meeting data features determiner 260 of FIG. 2. The comparison may comprise determining a relatedness, such as a dissimilarity of the first and second aspects, as further described herein. In one example, comparing (block 730) the first aspect and the second aspects includes determining a relatedness of a segment associated with the first aspect to another segment associated with the second aspect. In another example, comparing (block 730) the first aspect and the second aspects includes determining a relatedness of a first aspect to a second aspect, both contained within the same segment. In some embodiments, the segment determiner 270 of FIG. 2 and the sensitivity analyzer 280 of FIG. 2 perform aspects of the comparison (block 730). Additional embodiments of a comparison performed at block 730 are described in connection to sensitivity analyzer 280 of FIG. 2.

At block 740, method 700 includes determining to apply a sensitivity mitigation action. In some embodiments of block 740, the determination to apply a sensitivity mitigation action is based at least on the relatedness determined from the comparison (block 730) between the first aspect and the second aspect. Further, in some embodiments, a particular sensitivity mitigation action to be applied is also determined. In one example embodiment, a sensitivity mitigation action is determined (block 740) for application to the first aspect. In another example, a sensitivity mitigation action is determined (block 740) for application to a segment of the meeting presentation that includes the first aspect. In one example, the sensitivity mitigation action is determined to be applied (block 740) based on a meeting data feature associated with a segment to which the sensitivity mitigation action is applied. In some embodiments, the sensitivity mitigation engine 290 of FIG. 2 performs aspects of the determination (block 740). Additional embodiments of a comparison performed at block 740 are described in connection to sensitivity analyzer 280 of FIG. 2.

At block 750, method 700 includes generating a modified meeting presentation based on the sensitivity mitigation action (determined at block 740). In some embodiments, the sensitivity mitigation is applied at (or near) real time or as a post-processing operation to the meeting presentation, respectively, to generate (block 750) the modified meeting presentation. In one example, the modified meeting presentation is generated (block 750) based on at least a partial removal of an aspect of the meeting presentation such as the partial removal of a meeting data feature. In one example, the modified meeting presentation is based on modification of a visual or audio content as determined by the sensitivity mitigation engine 290. In some embodiments, the meeting presentation modifier 292 of FIG. 2 performs aspects of generating the (block 750) modified meeting presentation. Additional embodiments of a generating a modified meeting presentation are described in connection to sensitivity mitigation engine 290 of FIG. 2.

Some embodiments of method 700 further include providing the modified meeting presentation to attendees of a meeting or viewers of the meeting recording. In one example embodiment, the modified meeting presentation is provided to only a portion of the meeting attendees. For example, as described in connection with sensitivity analyzer 280 and sensitivity mitigation engine 290, certain meeting content may be determined to be sensitive to certain meeting attendees or meeting presentation viewers based on an authorization level associated with those attendees or viewers. Accordingly, for those attendees or viewers who are not authorized to view certain content instead are provided the modified meeting presentation, while those attendees or viewers who are authorized to view the certain content will be provide a version of the meeting presentation that is unmodified.

Some embodiments of method 700 further comprise presenting an indication to a user that the first aspect (or a segment that includes the first aspect) may contain sensitive content. In some embodiments, method 700 further includes presenting, via a user interface, a selectable sensitivity mitigation action corresponding to the first aspect. In one example, the user interface may be implemented as a sensitivity control GUI element 306, such as described in FIGS. 3 and 4, or an action customization region 520, such as described in FIG. 5. In these embodiments of method 700, the user interface may be utilized to receive, from the user via the user interface, a selection of the selectable sensitivity mitigation action. Further, some embodiments of block 740 determine the sensitivity mitigation action according to the received user selection. Similarly, some embodiments of block 750 generate a modified meeting presentation based on the sensitivity mitigation action that corresponds to the received user selection.

With reference to FIG. 8, aspects of example process flow 800 are illustratively provided for causing the meeting presentation to be provided with the sensitivity mitigation action applied or generating a modified meeting presentation. Example process flow 800 is performed to cause the meeting presentation to be provided with the sensitivity mitigation action applied or generate a modified meeting presentation, as described in connection with FIG. 2. Providing and generating the modified meeting presentation can be based on the meeting data feature determiner 260, the enriched meeting playback timeline assembler 270, the enriched meeting data 280, and/or the enriched meeting end-user application 290, among other components, including but not limited to those described in connection with FIG. 2.

At a block 810, method 800 includes receiving user-meeting data associated with a meeting, a meeting presentation, or a user operating the computing device. In one example, the user-meeting data associated with the user/meeting is received from one or more computing devices used by that user and/or from storage associated with that user, such as storage 225, described in connection with FIG. 2. Some embodiments of block 810 perform operations including receiving user-meeting data, as discussed in FIG. 2 with respect to the meeting-data collection component 210 and the meeting data feature determiner 260. In particular, user-meeting data may include any data associated with the user and a meeting attended by the user, an example of which includes meeting information, transcript information, contact information, and other user or meeting-related data discussed herein. In particular, in some instances user-meeting data is processed to determine other user-meeting data, such as interpretive data. For example, the user data is processed to determine a context associated with the user or to infer the user's intent. Accordingly, user-meeting data received at block 810 can indicate (or be used to determine) a context or intent of the user. Further, in some embodiments of method 800, this user-meeting data can be used at block 820 to determine one or more meeting data features from the user-meeting data and for corresponding segments, at block 830 for determining relevance to the user between segments, or at block 840 to determine a sensitivity mitigation action.

Some embodiments of block 810 including using one or more sensors, as described previously, that are configured to determine the user-meeting data. For example, a sensor operating on (or associated with) the computing device, which includes a software-based sensor or monitor, detects certain user-meeting data associated with the user, such as data regarding a computing application being used by the user, or other user activity data. Further, in some embodiments, the user-meeting data is converted into structured data and/or user-meeting data features are extracted so that the structured user-meeting data or user-meeting data features are used in the operations of block 810 (or other operations of method 800) to determine, for example, and among other data, contextual data for the user and/or one or more meeting data features.

At block 820, method 800 includes determining a first and second meeting data feature based on the user-meeting data. The meeting data features may include features indicative of, among other measurable properties, a gap of the meeting presentation, an identity of a speaker in the meeting presentation, a relationship of the speaker to a viewer, a topic of the meeting presentation, a type of meeting presentation, a visual feature, an audio feature, a contextual feature, a user-input feature, a duration of the meeting presentation, a duration of pauses in the meeting presentation, a transition from a first speaker to a second speaker different from the first speaker, a meeting type, a media type, or contextual metadata expressed as data features indicative of meeting invitees, meeting attendees, or a type of meeting, and the like. In one embodiment, the meeting data features are determined by meeting data feature determiner 260 of FIG. 2, as discussed above.

At block 830, method 800 includes determining a relatedness between the first and second segments based at least in part on the first and second meeting data features. In one example, aspects of the relatedness are determined by the segment determiner 270 of FIG. 2. In one embodiment, determining the relatedness includes comparing the first meeting data feature of a first segment and the second meeting data feature of a second segment, such that the relatedness is determined based on the comparison.

Thereafter, in one example, the sensitivity mitigation action is determined (block 840) based on the relatedness. Indeed, at block 840, method 800 includes determining and applying a sensitivity mitigation action to the first segment and/or the second segment based at least in part on the relatedness (determined at block 830). Additionally, at block 850, the meeting presentation is provided with the sensitivity mitigation action applied to at least one of the first segment or the second segment to generate a sensitivity-compliant segment that has had at least a portion of the sensitive content removed. In some embodiments, the sensitivity mitigation is applied at (or near) real time or as a post-processing operation to the meeting presentation, respectively, to generate (block 750) the modified meeting presentation.

At block 860, method 800 includes generating, based on the sensitivity mitigation action, a modified meeting presentation that includes the sensitivity-compliant segment. In one example, the modified meeting presentation is generated (block 860) based on removal or modification of a visual or audio content as determined by the sensitivity mitigation engine 290. In some embodiments, the meeting presentation modifier 292 of FIG. 2 performs aspects of generating (block 860) the modified meeting presentation.

With reference to FIG. 9, aspects of example process flow 900 are illustratively provided for generating a sensitivity control GUI element that includes an indication of at least one flagged candidate segment. An example sensitivity control GUI element 306 is illustrated in FIGS. 3, 4, and 5. Providing and generating the sensitivity control GUI element 306 can be based on the meeting data feature determiner 260, the enriched meeting playback timeline assembler 270, the enriched meeting data 280, and/or the enriched meeting end-user application 290, among other components, including but not limited to those described in connection with FIG. 2.

At a block 910, method 900 includes receiving user-meeting data associated with a meeting, a meeting presentation, or a user operating the computing device. In one example, the user-meeting data associated with the user/meeting is received from one or more computing devices used by that user and/or from storage associated with that user, such as storage 225, described in connection with FIG. 2. Some embodiments of block 910 perform operations including receiving user-meeting data, as discussed in FIG. 2 with respect to the meeting-data collection component 210 and the meeting data feature determiner 260. In particular, user-meeting data may include any data associated with the user and a meeting attended by the user, an example of which includes meeting information, transcript information, contact information, and other user or meeting-related data discussed herein. In particular, in some instances user-meeting data is processed to determine other user-meeting data, such as interpretive data. For example, the user-meeting data is processed to determine a context associated with the user or to infer the user's intent. Accordingly, user-meeting data received at block 910 can indicate (or be used to determine) a context or intent of the user. Further, in some embodiments of method 900, this user-meeting data can be used, at block 920, to determine one or more meeting data features from the user-meeting data; at block 930, for determining at least one flagged candidate segment; and at block 940, to determine an event time of the at least one candidate segment relative to a timing of the meeting or of the meeting presentation.

Some embodiments of block 910 including using one or more sensors, as described previously, that are configured to determine the user-meeting data. For example, a sensor operating on (or associated with) the computing device, which includes a software-based sensor or monitor, detects certain user-meeting data associated with the user, such as data regarding a computing application being used by the user, or other user activity data. Further, in some embodiments, the user-meeting data is converted into structured data and/or user-meeting data features are extracted so that the structured user-meeting data or user-meeting data features are used in the operations of block 910 (or other operations of method 900) to determine, for example, and among other data, contextual data for the user and/or one or more meeting data features.

At block 920, method 900 includes determining at least one meeting data feature based on the user-meeting data. The meeting data feature may include a feature indicative of, among other determinable properties, a gap of the meeting presentation, an identity of a speaker in the meeting presentation, a relationship of the speaker to a viewer, a topic of the meeting presentation, a type of meeting presentation, a visual feature, an audio feature, a contextual feature, a user-input feature, a duration of the meeting presentation, a duration of pauses in the meeting presentation, a transition from a first speaker to a second speaker different from the first speaker, a meeting type, a media type, or contextual metadata expressed as data features indicative of meeting invitees, meeting attendees, or a type of meeting, and the like. In one embodiment, the meeting data features are determined by meeting data feature determiner 260 of FIG. 2, as discussed above.

At block 930, method 900 includes determining a candidate meeting segment that includes sensitive content. In one example, aspects of the candidate segment and corresponding sensitive content are determined (block 930) by the segment determiner 270, sensitivity analyzer 280, and/or other components of FIG. 2. The candidate segment maybe flagged to facilitate evaluation for application of a sensitivity mitigation action. In one embodiment, an event time is determined (block 940) for the flagged candidate segment. In one embodiment, the event time is correlated to a corresponding time of the meeting presentation.

At block 950, method 900 includes generating a sensitivity control GUI element that includes an indication of the flagged candidate segment and that is selectable to control application of the sensitivity mitigation action to the flagged candidate segment. Example sensitivity control GUI elements 306 are illustrated in FIGS. 3, 4, and 5. In this manner, a user is empowered to control or customize application of the sensitive mitigation action to the flagged candidate segment to generate a modified meeting presentation.

Moreover, several example GUIs for empowering a user to control or customize application of the sensitive mitigation action to a flagged candidate segment are illustrated with respect to FIGS. 3, 4, and 5, and described further in connection with these drawings.

Accordingly, we have described various aspects of technology directed to systems and methods for intelligently processing, on a computing device, user-meeting data for facilitating compliance with a privacy policy through automated or semi-automated techniques. It is understood that various features, sub-combinations, and modifications of the embodiments described herein are of utility and may be employed in other embodiments without reference to other features or sub-combinations. Moreover, the order and sequences of steps shown in the example methods 700, 800, and 900 are not meant to limit the scope of the present disclosure in any way, and in fact, the steps may occur in a variety of different sequences within embodiments hereof. Such variations and combinations thereof are also contemplated to be within the scope of embodiments of this disclosure.

Other Embodiments

In some embodiments, a computer system is provided, such as the computerized (or computer or computing) system described in any of the embodiments above. The computer system comprises at least one processor, and computer memory having computer-readable instructions embodied thereon, that, when executed by the at least one processor, perform operations. The operations comprise receiving meeting data associated with a meeting presentation; determining a first aspect of meeting presentation content and a second aspect of meeting presentation content based on the meeting data; comparing the first aspect and the second aspect to determine a relatedness of the first aspect and the second aspect; and determining to apply a sensitivity mitigation action based at least in part on the relatedness of the first aspect and the second aspect. The sensitivity mitigation action includes at least partial removal of the first aspect. The operations further include generating a modified meeting presentation, based on the sensitivity mitigation action.

In any combination of the above embodiments of the system, the first aspect corresponds to a visual feature and the second aspect corresponds to an audio feature. The first aspect and the second aspect occur substantially concurrently, within the same segment of the meeting presentation, or within proximate segments of the meeting presentation.

In any combination of the above embodiments of the system, the first aspect comprises text extracted from a visual image and the second aspect comprises a portion of a transcript determined from audio.

In any combination of the above embodiments of the system, the operations further comprise: determining an authorization level associated with a portion of meeting attendees; automatically determining to present the modified meeting presentation to the portion of meeting attendees based on the authorization level; and automatically determining to present an unmodified meeting presentation to a meeting attendee who is not included in the portion of meeting attendees.

In any combination of the above embodiments of the system, comparing the first aspect and the second aspect to determine the relatedness comprises performing a semantic similarity comparison of the first aspect and the second aspect to determine a semantic similarity, such that the relatedness is based on the semantic similarity; and based on the semantic similarity indicating a level of dissimilarity, determining the first aspect likely comprises sensitive content.

In any combination of the above embodiments of the system, the operations further comprise: based on the relatedness of the first aspect and the second aspect, applying the first aspect to a machine-learning (ML) model trained on aspects of meeting content that other users have indicated as comprising sensitive content; determining, using the ML model, a likelihood that the first aspect corresponds to sensitive content; and based on the likelihood that the first aspect corresponds to sensitive content, providing an indication that the first aspect may contain sensitive content, or providing an indication that a meeting segment in which the first aspect occurs may contain sensitive content.

In any combination of the above embodiments of the system, the operations further comprise: based on the relatedness of the first aspect and the second aspect, presenting an indication that the first aspect may contain sensitive content and presenting, via a user interface, a selectable sensitivity mitigation action corresponding to the first aspect; receiving, via the user interface, a selection of the selectable sensitivity mitigation action; and determining the sensitivity mitigation action according to the received selection.

In any combination of the above embodiments of the system, generating the modified meeting presentation comprises altering, according to the sensitivity mitigation action, an audio portion or a video portion of the meeting presentation content of the first aspect. Altering the audio portion comprises at least one of: muting the audio, distorting the audio, replacing the audio with other audio, or bleeping the audio. Altering the video portion comprises at least one of: removing visual content, applying a masking overlay to visual content, or blurring visual content.

In any combination of the above embodiments of the system, the operations further comprise determining a segment of the meeting presentation based on the meeting data. The first aspect is determined for the segment of the meeting presentation. The modified meeting presentation is generated based on applying the sensitivity mitigation action to the segment of the meeting presentation to generate a sensitivity compliant segment.

In some embodiments, a computer system is provided, such as the computerized (or computer or computing) system described in any of the embodiments above. The computer system comprises at least one processor, and computer memory having computer-readable instructions embodied thereon, that, when executed by the at least one processor, perform operations. The operations comprise receiving user-meeting data associated with a meeting presentation; determining, based on the user-meeting data, a first meeting data feature for a first segment of the meeting presentation and a second meeting data feature of a second segment of the meeting presentation; based at least in part on the first meeting data feature and the second meeting data feature, determining a relatedness between the first segment and the second segment; based at least in part on the relatedness, applying a sensitivity mitigation action to at least one of the first segment or the second segment; causing the meeting presentation to be provided with the sensitivity mitigation action applied to the at least one of the first segment or the second segment to generate a sensitivity-compliant segment; and generating a modified meeting presentation comprising the sensitivity-compliant segment.

In any combination of the above embodiments of the system, causing the meeting presentation to be provided with the sensitivity mitigation action applied comprises generating a graphical user interface element comprising a selectable control selectable to customize the application of the sensitivity mitigation action. The modified meeting presentation is generated based on the selection to the selectable control.

In any combination of the above embodiments of the system, generating the modified meeting presentation comprises modifying presentation of the meeting presentation based on the sensitive mitigation action.

In any combination of the above embodiments of the system, generating the modified meeting presentation comprises generating a graphical user interface element that receives user inputs to label the second segment, wherein the user-label for the second segment is used by a machine-learning model.

In any combination of the above embodiments of the system, applying the sensitivity mitigation action comprises at least one of: removing the second segment to generate the modified meeting presentation without the second segment, flagging the second segment for additional review, removing audio from the second segment, or removing visual content from the second segment.

In any combination of the above embodiments of the system, determining the relatedness comprises: comparing the first meeting data feature of the first segment and the second meeting data feature of the second segment, wherein the relatedness is determined based on the comparison; and based on the relatedness, determining the sensitive mitigation action.

In any combination of the above embodiments of the system, at least one of the first segment or the second segment is determined by determining a contiguous portion of the meeting presentation having a common meeting data feature comprising an indication of: a speaker, a topic, an audio content, a visual content, a relatedness weight, a media type, or a meeting attendee; determining a start time of the contiguous portion of the meeting presentation that corresponds to a first change of the common meeting data feature; determining an end time of the contiguous portion of the meeting presentation that corresponds to a second change of the common meeting data feature; and determining the first segment or the second segment of the meeting presentation as the contiguous portion of the meeting presentation from the start time to the end time.

In any combination of the above embodiments of the system, at least one of the first meeting data feature or the second meeting data feature comprises at least one of: a gap of the meeting presentation, an identity of a speaker in the meeting presentation, a relationship of the speaker to a viewer, a topic of the meeting presentation, a type of meeting presentation, a visual feature, an audio feature, a contextual feature, a user-input feature, a duration of the meeting presentation, a duration of pauses in the meeting presentation, a transition from a first speaker to a second speaker different from the first speaker, a meeting type, a media type, or contextual metadata expressed as data features indicative of meeting invitees, meeting attendees, or a type of meeting.

In some embodiments, a computer system is provided, such as the computerized (or computer or computing) system described in any of the embodiments above. The computer system comprises at least one processor, and computer memory having computer-readable instructions embodied thereon, that, when executed by the at least one processor, perform operations. The operations comprise receiving user-meeting data associated with a meeting presentation; determining at least one meeting data feature from the user-meeting data; based at least in part on the at least one meeting data feature, determining at least one flagged candidate segment, of the meeting presentation, comprising sensitive content; determining an event time of the at least one flagged candidate segment relative to a timing of the meeting presentation; and generating, for presentation via a graphical user interface (GUI), a sensitivity flagging GUI element that comprises an indication of the at least one flagged candidate segment and that is selectable to cause the at least one flagged candidate segment to be modified based on a sensitivity mitigation action.

In any combination of the above embodiments of the system, the GUI comprises a sensitivity timeline that comprises a timeline comprising an indication for the at least one flagged segment relative to the timing of the meeting presentation, wherein the sensitivity flagging GUI element is presentable near the indication of the at least one flagged segment on the timeline.

In any combination of the above embodiments of the system, the GUI comprises an action customization region to select another sensitivity mitigation action, instead of the sensitivity mitigation action, to be applied to the at least one flagged candidate segment.

Example Computing Environments

Figure 10:
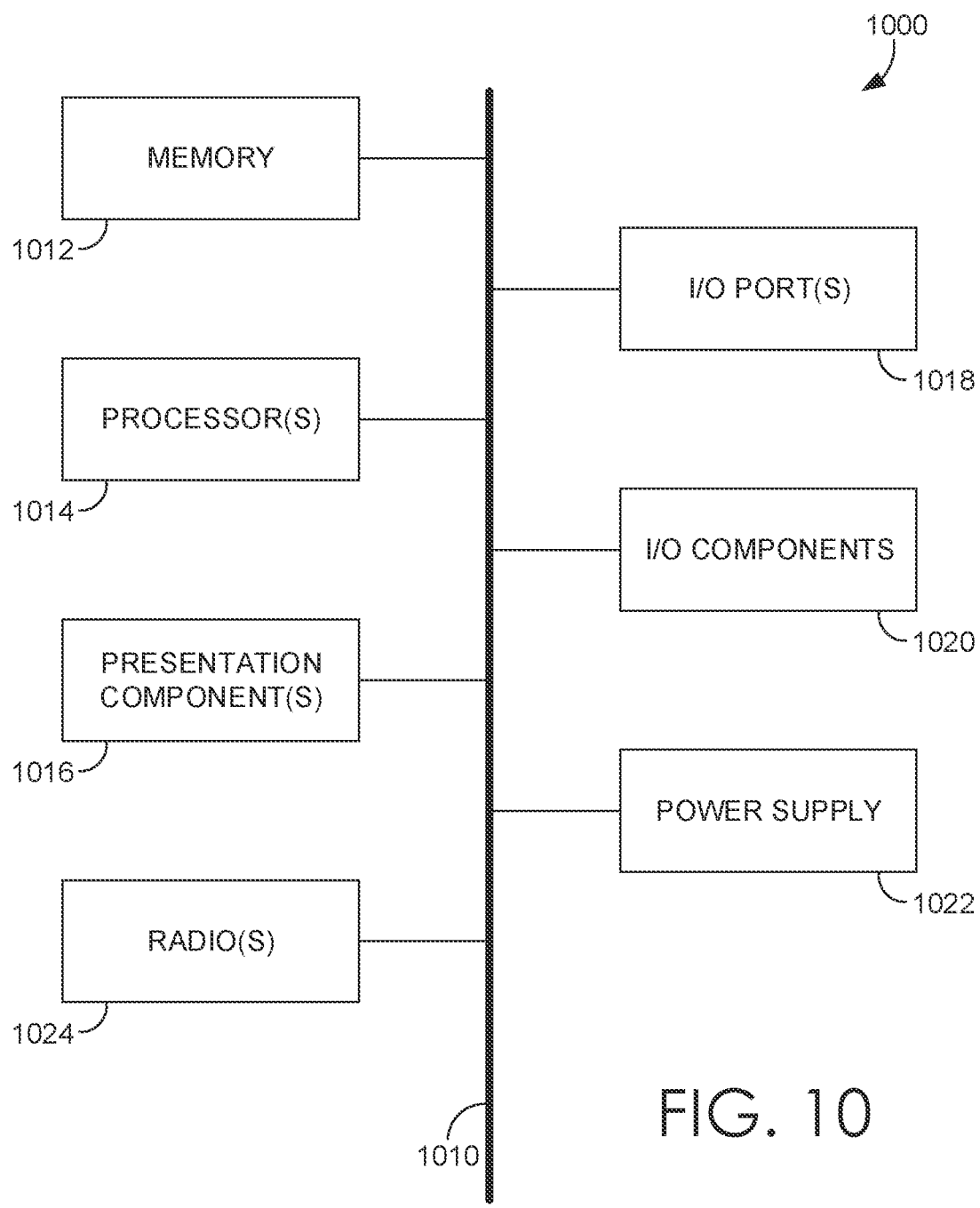
FIG. 10 is a block diagram of an example computing environment suitable for use in implementing an embodiment of the present disclosure.
Figure 11:
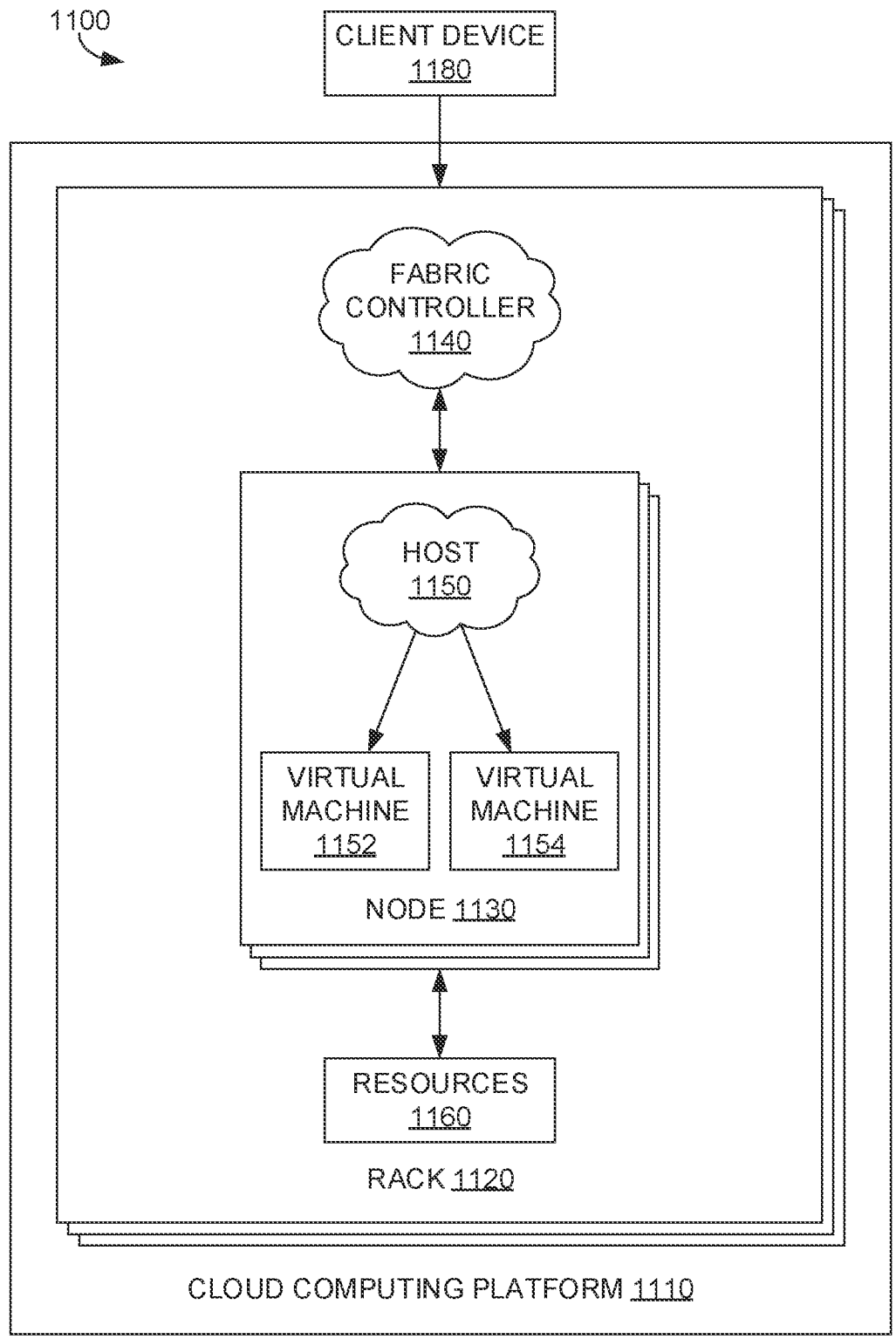
FIG. 11 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 10 and 11, respectively. With reference to FIG. 10, an example computing device is provided and referred to generally as computing device 1000. The computing device 1000 is but one example of a suitable computing environment and is not intended to suggest any limitation as to the scope of use or functionality of embodiments of the disclosure. Neither should the computing device 1000 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher levels of software. Accordingly, in some embodiments, computer-executable instructions may include any software, including low level software written in machine code, higher level software such as application software, and any combination thereof. In this regard, the system components can manage resources and provide services for system functionality. Any other variations and combinations thereof are contemplated with the embodiments of the present disclosure.

With reference to FIG. 10, computing device 1000 includes a bus 1010 that directly or indirectly couples the following devices: memory 1012, one or more processors 1014, one or more presentation components 1016, one or more input/output (I/O) ports 1018, one or more I/O components 1020, and an illustrative power supply 1022. Bus 1010 represents what may be one or more buses (such as an address bus, data bus, or combination thereof). Although the various blocks of FIG. 10 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 10 is merely illustrative of an example computing device that can be used in connection with one or more embodiments of the present disclosure. Distinction is not made between such categories as "workstation," "server," "laptop," or "handheld device," as all are contemplated within the scope of FIG. 10 and with reference to "computing device."

Computing device 1000 typically includes a variety of computer-readable media. Computer-readable media can be any available media that can be accessed by computing device 1000 and includes both volatile and nonvolatile, removable and non-removable media. By way of example, and not limitation, computer-readable media comprises computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. The memory may be removable, non-removable, or a combination thereof. Hardware devices include, for example, solid-state memory, hard drives, and optical-disc drives. Computing device 1000 includes one or more processors 1014 that read data from various entities such as memory 1012 or I/O components 1020. As used herein, the term processor or "a processor" may refer to more than one computer processor. For example, the term processor (or "a processor") may refer to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor may be performed by more than one processor.

Presentation component(s) 1016 presents data indications to a user or other device. Presentation components include, for example, a display device, speaker, printing component, vibrating component, and the like.

The I/O ports 1018 allow computing device 1000 to be logically coupled to other devices, including I/O components 1020, some of which may be built in. Illustrative components include a microphone, joystick, game pad, satellite dish, scanner, printer, or a wireless device. The I/O components 1020 may provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Some embodiments of computing device 1000 include one or more radio(s) 1024 (or similar wireless communication components). The radio transmits and receives radio or wireless communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Referring now to FIG. 11, an example distributed computing environment 1100 is illustratively provided, in which implementations of the present disclosure may be employed. In particular, FIG. 11 shows a high level architecture of an example cloud computing platform 1110 that can host a technical solution environment, or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1100 that includes cloud computing platform 1110, rack 1120, and node 1130 (for example, computing devices, processing units, or blades) in rack 1120. The technical solution environment can be implemented with cloud computing platform 1110, which runs cloud services across different data centers and geographic regions. Cloud computing platform 1110 can implement fabric controller 1140 component for provisioning and managing resource allocation, deployment, upgrade, and management of cloud services. Typically, cloud computing platform 1110 acts to store data or run service applications in a distributed manner. Cloud computing platform 1110 in a data center can be configured to host and support operation of endpoints of a particular service application. Cloud computing platform 1110 may be a public cloud, a private cloud, or a dedicated cloud.

Node 1130 can be provisioned with host 1150 (for example, operating system or runtime environment) running a defined software stack on node 1130. Node 1130 can also be configured to perform specialized functionality (for example, compute nodes or storage nodes) within cloud computing platform 1110. Node 1130 is allocated to run one or more portions of a service application of a tenant. A tenant can refer to a customer utilizing resources of cloud computing platform 1110. Service application components of cloud computing platform 1110 that support a particular tenant can be referred to as a multi-tenant infrastructure or tenancy. The terms "service application," "application," or "service" are used interchangeably with regards to FIG. 11, and broadly refer to any software, or portions of software, that run on top of, or access storage and computing device locations within, a datacenter.

When more than one separate service application is being supported by nodes 1130, nodes 1130 may be partitioned into virtual machines (for example, virtual machine 1152 and virtual machine 1154). Physical machines can also concurrently run separate service applications. The virtual machines or physical machines can be configured as individualized computing environments that are supported by resources 1160 (for example, hardware resources and software resources) in cloud computing platform 1110. It is contemplated that resources can be configured for specific service applications. Further, each service application may be divided into functional portions such that each functional portion is able to run on a separate virtual machine. In cloud computing platform 1110, multiple servers may be used to run service applications and perform data storage operations in a cluster. In one embodiment, the servers perform data operations independently but exposed as a single device, referred to as a cluster. Each server in the cluster can be implemented as a node.

Client device 1180 may be linked to a service application in cloud computing platform 1110. Client device 1180 may be any type of computing device, such as user device 102*n* described with reference to FIG. 1, and the client device 1180 can be configured to issue commands to cloud computing platform 1110. In embodiments, client device 1180 communicates with service applications through a virtual Internet Protocol (IP) and load balancer or other means that direct communication requests to designated endpoints in cloud computing platform 1110. The components of cloud computing platform 1110 may communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b). Moreover, in one example, "substantially" when used in the context of having a degree of similarity or overlap refers to elements differing less than a threshold amount, expressed as a percentage, ratio, threshold number, and so forth, such as elements differing less than 5, 10, 15, 20%, and so forth.

As used herein, the term "set" may be employed to refer to an ordered (for example, sequential) or an unordered (for example, non-sequential) collection of objects (or elements), such as machines (for example, computer devices), physical and/or logical addresses, graph nodes, graph edges, functionalities, and the like. As used herein a set may include N elements, where N is any positive integer. That is, a set may include 1, 2, 3, . . . N objects and/or elements, where N is a positive integer with no upper bound. Therefore, as used herein, a set does not include a null set (for example, an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the not null or empty set of objects. A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjoint sets if the intersegment between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment; however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer system, comprising:
at least one processor; and
computer memory having computer-readable instructions embodied thereon, that, when executed by the at least one processor, perform operations comprising:
receiving meeting data associated with a meeting presentation;
determining, based on the meeting data, a first aspect of meeting presentation content and a second aspect of meeting presentation content, wherein the first aspect and the second aspect share a time-related feature, and wherein the first aspect corresponds to a visual feature and the second aspect corresponds to an audio feature;
comparing the first aspect and the second aspect to determine a relatedness of the first aspect and the second aspect within a time frame defined by the time-related feature;
determining to apply a sensitivity mitigation action based at least in part on the relatedness of the first aspect and the second aspect, the sensitivity mitigation action comprising at least partial removal of the first aspect corresponding to the visual feature; and
generating a modified meeting presentation with the at least partial removal of the first aspect corresponding to the visual feature, based on the sensitivity mitigation action.

2. The system of claim 1, wherein the first aspect and the second aspect occur substantially concurrently, within a same segment of the meeting presentation, or within proximate segments of the meeting presentation.

3. The system of claim 1, wherein the first aspect comprises text extracted from a visual image and the second aspect comprises a portion of a transcript determined from audio.

4. The system of claim 1, wherein the operations further comprise:
determining an authorization level associated with a portion of meeting attendees;
automatically determining to present the modified meeting presentation to the portion of meeting attendees based on the authorization level; and
automatically determining to present an unmodified meeting presentation to a meeting attendee who is not included in the portion of meeting attendees.

5. The system of claim 1, wherein comparing the first aspect and the second aspect to determine the relatedness comprises:
performing a semantic similarity comparison of the first aspect and the second aspect to determine a semantic similarity, wherein the relatedness is based on the semantic similarity; and
based on the semantic similarity indicating a level of dissimilarity, determining the first aspect likely comprises sensitive content.

6. The system of claim 1, wherein the operations further comprise:
based on the relatedness of the first aspect and the second aspect, applying the first aspect to a machine-learning (ML) model trained on aspects of meeting content that other users have indicated as comprising sensitive content;
determining, using the ML model, a likelihood that the first aspect corresponds to sensitive content; and
based on the likelihood that the first aspect corresponds to sensitive content, providing an indication that the first aspect may contain sensitive content, or providing an indication that a meeting segment in which the first aspect occurs may contain sensitive content.

7. The system of claim 1, wherein the operations further comprise:
based on the relatedness of the first aspect and the second aspect, presenting an indication that the first aspect may contain sensitive content and presenting, via a user interface, a selectable sensitivity mitigation action corresponding to the first aspect;
receiving, via the user interface, a selection of the selectable sensitivity mitigation action; and
determining the sensitivity mitigation action according to the received selection.

8. The system of claim 1:
wherein generating the modified meeting presentation comprises altering, according to the sensitivity mitigation action, an audio portion or a video portion of the meeting presentation content of the first aspect;
wherein altering the audio portion comprises at least one of: muting the audio portion, distorting the audio portion, replacing the audio portion with other audio, or bleeping the audio portion; and
wherein altering the video portion comprises at least one of: removing visual content, applying a masking overlay to visual content, or blurring visual content.

9. The system of claim 1, wherein the operations further comprise:
determining a segment of the meeting presentation based on the meeting data;

wherein the first aspect is determined for the segment of the meeting presentation; and wherein the modified meeting presentation is generated based on applying the sensitivity mitigation action to the segment of the meeting presentation to generate a sensitivity compliant segment.

10. The system of claim 1, wherein the modified meeting presentation is generated at or near-real time or is generated before being uploaded to a server device.

11. A computer system, comprising:
at least one processor; and
computer memory having computer-readable instructions embodied thereon, that, when executed by the at least one processor, perform operations comprising:
receiving user-meeting data associated with a meeting presentation;
determining, based on the user-meeting data, a first meeting data feature for a first segment of the meeting presentation and a second meeting data feature of a second segment of the meeting presentation, wherein the first segment and the second segment occur within a time frame defined by a time-related feature shared between the first meeting data feature and the second meeting data feature, and wherein the first meeting data feature comprises a visual feature and the second meeting data feature comprises to an audio feature;
based at least in part on the first meeting data feature and the second meeting data feature, determining a relatedness between the first segment and the second segment;
based at least in part on the relatedness, applying a sensitivity mitigation action to at least one of the first segment or the second segment, wherein applying the sensitivity mitigation action comprises at least one of:
partially removing, from the first segment, visual content associated with the first meeting data feature, or
partially removing, from the second segment, audio content associated with the second meeting data feature;
causing the meeting presentation to be provided with the sensitivity mitigation action applied to the at least one of the first segment or the second segment to generate a sensitivity-compliant segment; and
generating a modified meeting presentation comprising the sensitivity-compliant segment.

12. The system of claim 11, wherein causing the meeting presentation to be provided with the sensitivity mitigation action applied comprises generating a graphical user interface element comprising a selectable control selectable to customize applying the sensitivity mitigation action, wherein the modified meeting presentation is generated based on the selection to the selectable control.

13. The system of claim 11, wherein generating the modified meeting presentation comprises:
modifying presentation of the meeting presentation based on the sensitive mitigation action; or
generating a graphical user interface element that receives user inputs to label the second segment, wherein the user-label for the second segment is used by a machine-learning model.

14. The system of claim 10, wherein applying the sensitivity mitigation action comprises at least one of: removing the first segment or the second segment to generate the modified meeting presentation without the first segment or the second segment, flagging the first segment or the second segment for additional review, removing audio from the first segment or the second segment, or removing visual content from the first segment or the second segment.

15. The system of claim 11, wherein determining the relatedness comprises:
comparing the first meeting data feature of the first segment and the second meeting data feature of the second segment, wherein the relatedness is determined based on the comparison; and
based on the relatedness, determining the sensitive mitigation action.

16. The system of claim 11, wherein at least one of the first segment or the second segment is determined by:
determining a contiguous portion of the meeting presentation having a common meeting data feature comprising an indication of: a speaker, a topic, an audio content, a visual content, a relatedness weight, a media type, or a meeting attendee;
determining a start time of the contiguous portion of the meeting presentation that corresponds to a first change of the common meeting data feature;
determining an end time of the contiguous portion of the meeting presentation that corresponds to a second change of the common meeting data feature; and
determining the first segment or the second segment of the meeting presentation as the contiguous portion of the meeting presentation from the start time to the end time.

17. The system of claim 11, wherein at least one of the first meeting data feature or the second meeting data feature comprises at least one of: a gap of the meeting presentation, an identity of a speaker in the meeting presentation, a relationship of the speaker to a viewer, a topic of the meeting presentation, a type of meeting presentation, another visual feature, another audio feature, a contextual feature, a user-input feature, a duration of the meeting presentation, a duration of pauses in the meeting presentation, a transition from a first speaker to a second speaker different from the first speaker, a meeting type, a media type, or contextual metadata expressed as data features indicative of meeting invitees, meeting attendees, or a type of meeting.

18. A computer system comprising:
at least one processor; and
computer memory having computer-readable instructions embodied thereon, that, when executed by the at least one processor, perform operations comprising:
receiving user-meeting data associated with a meeting presentation;
determining, from the user-meeting data, a visual feature and an audio feature for at least one flagged candidate segment of the meeting presentation, wherein the visual feature and the audio feature share a time-related feature defining a time frame;
based at least in part on a relatedness between the visual feature and the audio feature, determining that the at least one flagged candidate segment, of the meeting presentation, comprises sensitive content within the time frame; and
generating, for presentation via a graphical user interface (GUI), a sensitivity flagging GUI element that comprises an indication of the at least one flagged candidate segment and that is selectable to cause the at least one flagged candidate segment to be modified based on a sensitivity mitigation action.

19. The computer system of claim 18, wherein the GUI comprises a sensitivity timeline that comprises a timeline comprising an indication for the at least one flagged candidate segment relative to a duration of the meeting presentation, wherein the sensitivity flagging GUI element is presentable near the indication of the at least one flagged candidate segment on the timeline.

20. The computer system of claim 18, wherein the GUI comprises an action customization region to select another sensitivity mitigation action, instead of the sensitivity mitigation action, to be applied to the at least one flagged candidate segment.

* * * * *